United States Patent [19]
Kenyon et al.

[11] Patent Number: 4,703,277
[45] Date of Patent: Oct. 27, 1987

[54] METHOD AND APPARATUS FOR OBTAINING PROPERTIES OF SUBSURFACE FORMATIONS FROM TEXTURAL MODELS DERIVED FROM FORMATION PARAMETERS

[75] Inventors: William E. Kenyon; Paul L. Baker; Pabitra N. Sen, all of Ridgefield; Jayanth R. Banavar, Avon, all of Conn.

[73] Assignee: Schlumberger Technology Corp., New York, N.Y.

[21] Appl. No.: 599,888

[22] Filed: Apr. 13, 1984

[51] Int. Cl.$^4$ ............................ G01V 3/18; G01V 3/38
[52] U.S. Cl. ........................................ 324/323; 73/152; 250/256; 324/338; 364/422
[58] Field of Search ............... 324/323, 338–343, 324/366, 376; 73/152; 364/422; 367/25; 250/253, 256

[56] References Cited

U.S. PATENT DOCUMENTS

| | | | |
|---|---|---|---|
| 3,081,033 | 3/1963 | Colburn | 324/323 X |
| 3,483,376 | 12/1969 | Locke et al. | |
| 3,590,228 | 6/1971 | Burke | |
| 3,760,260 | 9/1973 | Schuster | |
| 3,944,910 | 3/1976 | Rau | |
| 4,048,495 | 9/1977 | Ellis | |
| 4,313,164 | 1/1982 | Regat | 324/323 X |
| 4,340,934 | 7/1982 | Segesman | 324/323 X |

FOREIGN PATENT DOCUMENTS 282113 10/1966 Australia ............................ 324/333

OTHER PUBLICATIONS

Hanai, Tetsuya; "Theory of the Dielectric Dispersion Due to the Interfacial Polarization ...", *Kolloid-Zeitschrift*, 1960, pp. 23–30.
Hanai, Tetsuya; "Electrical Properties of Emulsions", *Emulsion Science*, Chapter 5, P. Sherman, Academic Press, 1968, pp. 354–478.
Wharton et al, Electromagnetic Propagation Logging: Advances in Technique and Interpretation, paper presented SPE 9267, 1980, pp. 1–12.
Sen et al, A Self-Similar Model for Sedimentary Rocks with Application to the Dielectric Constant of Fused Glass Beads, Geophysics, vol. 46, No. 5, May 1981, pp. 781–795.
Sen, P. N., Relation of Certain Geometrical Features to the Dielectric Anomaly of Rocks, Geophysics, vol. 46, No. 12 (Dec. 1981); pp. 1714–1720.
Mendelson et al, The Effect of Grain Anisotropy on the Electrical Properties of Sedimentary Rocks, Geophysics, vol. 47, No. 2 (Feb. 1982) p. 257–263.
Freeman et al, An Automated Frequency Domain Technique for Dielectric Spectros-Copy of Materials, J. Phys. E:Sci. Instrum., vol. 12, 1979, pp. 899–903.
Palaith et al, Improved Accuracy for Dielectric Data, The Institute of Physics, 1983, pp. 227–230.

*Primary Examiner*—Gerard R. Strecker
*Attorney, Agent, or Firm*—Peter Lee; Keith Smith; Martin Novack

[57] ABSTRACT

Well logging techniques are disclosed which use and/or measure formation textural parameters. A disclosed formation textural model is bimodal in nature, and includes fractions of spherical grains and of platey grains having a single aspect ratio. This model is used in obtaining improved well logging recordings.

92 Claims, 19 Drawing Figures

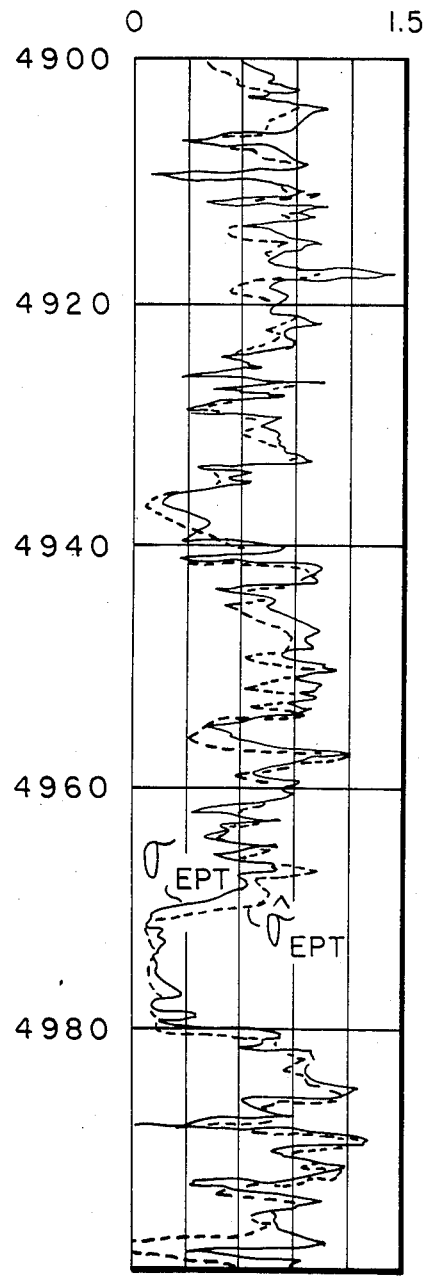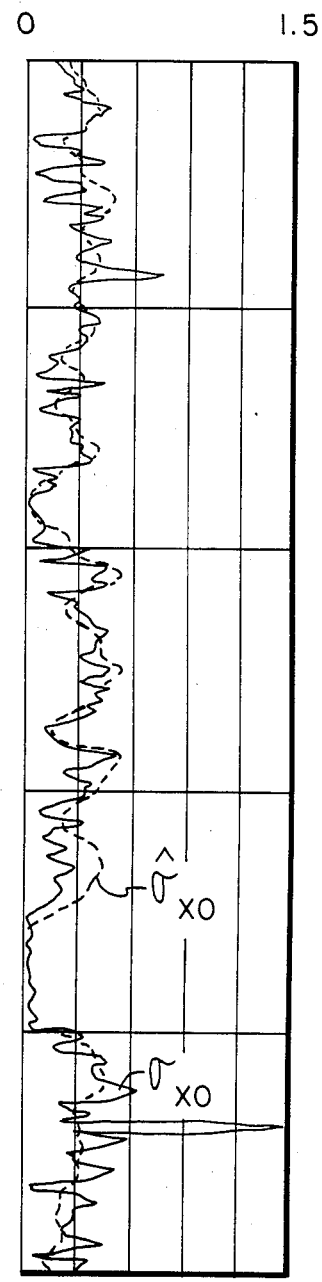
Fig. 14
Fig. 15

METHOD AND APPARATUS FOR OBTAINING PROPERTIES OF SUBSURFACE FORMATIONS FROM TEXTURAL MODELS DERIVED FROM FORMATION PARAMETERS

BACKGROUND OF THE INVENTION

This invention relates to well logging and, more particularly, to an apparatus and method for determining and/or using textural formation properties to obtain improved well logs.

In the well logging art, there are a number of properties of subsurface formations which are considered commercially important, and which have been the object of continuing efforts to identify techniques for improving measurement and interpretation accuracy. For example, a form of the well known Archie equation relates the conductivity of the formation, $\sigma$, to the conductivity of the water in the formation, $\sigma_w$, as follows:

$$\sigma = \sigma_w \phi_w^m \qquad (1)$$

where $\phi_w$ is the water-filled porosity of the formation, and m is the so-called "cementation" exponent of the formation, generally considered to be a number around 2. The water saturation of the formation, i.e., the fraction of pore spaces containing water, is expressed as:

$$S_w = \frac{\phi_w}{\phi_t} \qquad (2)$$

where $\phi_t$ is the total porosity of the formation. The hydrocarbon saturation, $S_h$ is the unity complement of the water saturation, i.e.:

$$S_h = 1 - S_w \qquad (3)$$

In many instances, the total porosity, $\phi_t$, can be determined with relatively good accuracy, so an accurate determination of water-filled porosity, $\phi_w$, would be particularly valuable in determining water saturation and hydrocarbon saturation. In a situation wherein the formation conductivity has been measured, and, for example, the water conductivity in the measured zone is known (such as in the formation invaded zone or from other inputs), one could use the Archie equation to determine $\phi_w$, if m were known. However, in many applications the cementation exponent m, which relates to factors that include the structural make-up of the rock, the nature of interconnection of the pores, etc., involves a degree of guesswork in its determination.

From this simplified description, it will be understood that it desirable to devise techniques for more accurately determining the water-filled porosity and the cementation of formations surrounding a borehole, and it is among the objectives of the present invention to set forth such techniques.

It has long been recognized in the well logging art that a knowledge of the dielectric permittivity of a formation surrounding a borehole would provide useful information concering the nature of fluids in the formation, since there is a striking contrast between the dielectric constant of water (about 80) and the dielectric constant of hydrocarbons (about 5). The development of electromagnetic propagation types of devices, such as the electromagnetic propagation tool ("EPT" device) described in U.S. Pat. No. 3,944,910, assigned to the same assignee as the present application, provided an improved technique for determining formation dielectric permittivity, as well as conductivity, at shallow depths of investigation. In applying the measurements obtained with an electromagnetic propagation type of device, it would again be desirable to have more accurate indications of the formation water-filled porosity and cementation which, in the case of the invaded zone, would provide useful information concerning the degree to which available hydrocarbons are capable of being flushed from the rock. Also, it would be desirable to have a means for better determining and interpreting the dielectric permittivity and conductivity as obtained from the electromagnetic propagation type of device, and it is among the further objects of the present invention to provide these improvements.

It has been recognized that the textural nature of the formation matrix can play an important role in affecting the electrical properties of rocks, although there has been an absence of practical application in the well logging art. It is among the further objects of the present invention to devise well logging techniques which can be used for determination of the textural properties of a formation matrix, and to use these properties in obtaining other formation parameters.

SUMMARY OF THE INVENTION

The present invention makes use of a textural model of the formation matrix, in conjunction with at least one electrical parameter measurement of the formation, in determining various properties of the formation, such as water-filled porosity, cementation exponent, and "quality check" values of formation conductivity.

In a form of the invention, one or more measured electrical parameters of the formation are used to obtain textural information about the formation matrix. For example, in the form of the invention, the measured formation dielectric permittivity and conductivity are utilized to obtain parameters which represent the texture of the formation matrix; i.e. the nature and distribution of its grains.

In the preferred embodiment of the invention, the textural model of the formation matrix has a "bimodal" distribution of grain shapes; i.e. two types of grains, spherical and platey. A platey grain is defined as having one relatively small dimension and two relatively large ones; e.g. an oblate spheroid. The platey grains are assumed to have a single representative aspect ratio. This model is particularly advantageous in providing sufficient flexibility to match actual conditions, without being so complex as to prevent practical solution and application.

In accordance with an exemplary embodiment of the invention, a method is set forth for determining the water-filled porosity of formations surrounding an earth borehole that has been logged by a well logging device. The dielectric permittivity of a formation is derived, such as directly from the logging device outputs or from information communicated from and/or stored at a logging site. A textural model of the formation is formulated as a function of the derived dielectric permittivity of the formation. The textural model includes variables which represent the fraction of platey grains and their aspect ratio. The textural model also includes parameters representation of formation properties that are considered as "knowns", for example, the dielectric permittivity and/or conductivity of the formation water. The water-filled porosity is then determined from the textural model.

The present invention has particularly advantageous application is clean carbonate formations in which a salty drilling mud has been used. However, the information can be used in other situations, for example with a clay correction, if clays are present in small amounts. Also, while the invention is well suited for use in conjunction with logging devices which measure invaded zone parameters, it also has application for use in conjunction with deeper investigation devices.

In a form of the invention, hydrocarbon content is considered in formulating the textural model.

Further features and advantages of the invention will become more readily apparent from the following detailed description when taken in conjunction with the accompanying drawings.

BRIEF DESCRIPTION OF THE DRAWINGS

FIGS. 13, 14 and 15 are modified versions of the logs of FIGS. 10, 11 and 12, using different textural parameter values.

DESCRIPTION OF THE PREFERRED EMBODIMENT

Figure 1:
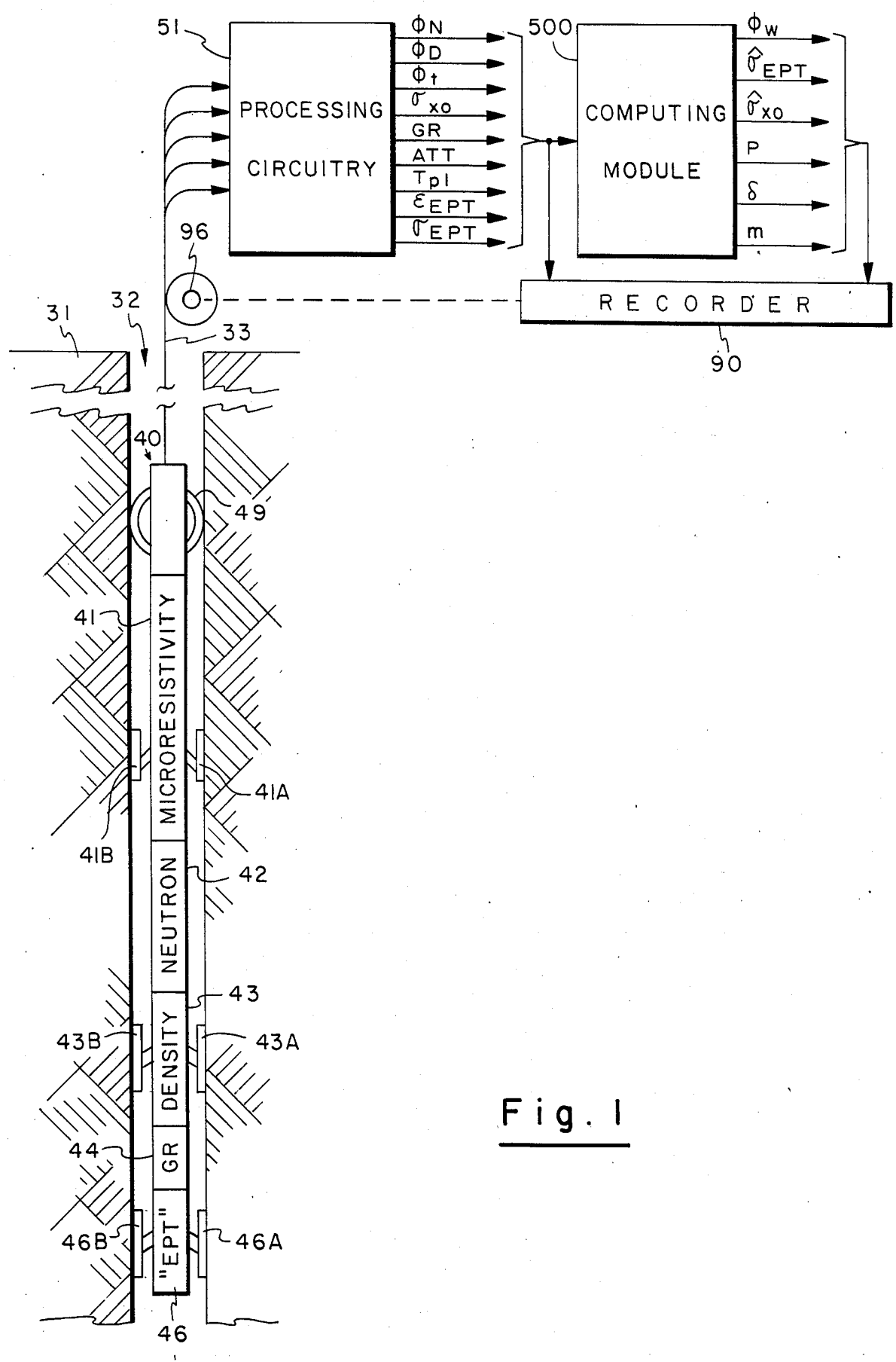
FIG. 1 is a block diagram, partially in schematic form, of an apparatus in accordance with an embodiment of the invention and which can be used to practice an embodiment of the method of the invention.

Referring to FIG. 1, there is shown a representative embodiment of an apparatus in accordance with the present invention for investigating subsurface formations 31 traversed by a borehole 32. The borehole 32 is typically filled with a drilling fluid or mud which contains finely divided solids in suspension. The investigating apparatus or logging device 40 is suspended in the borehole 32 on an armored cable 33, the length of which substantially determines the depth of the device 40. The cable length is controlled by suitable means at the surface such as a drum and winch mechanism (not shown). Circuitry 51, shown at the surface, although portions thereof may typically be downhole, represents processing circuitry for the various logging units of apparatus 40.

The investigating apparatus 40 includes a suitable shallow investigating resistivity-determining device such as a microresistivity device 41, which may be of the type described in U.S. Pat. No. 3,760,260. As is known in the art, the device 41 may include sidewall skid 41a which takes measurements used to determine the conductivity $\sigma_{xo}$ (or resistivity $R_{xo}$), of the formation invaded zone.

The downhole investigating apparatus also includes a neutron exploring device 42 which may be, for example, of the type disclosed, in U.S. Pat. No. 3,483,376. The neutron count is received by a processing circuit in the overall circuitry 51 which includes a function former that operates in well known manner to produce a signal $\phi_N$ which represents the formation porosity as determined by the neutron logging device. The investigating apparatus 40 further includes a formation density exploring device 43 for producing well logging measurements which can be utilized to calculate the density of the adjoining formations, in known manner. In this regard a skid 43A houses a source and two detectors (not shown) spaced different distances from the source. This arrangement of source and detectors produces signals that correspond to the density of the earth formations as is described, for example, in the U.S. Pat. No. 4,048,495. The circuitry 51 includes conventional circuits which convert the signals derived from the short and long spacing detectors to a computed density. The resulting density is applied to porosity computing circuitry within the block 51 which computes the porosity, as derived from the bulk density, in well known fashion. The derived porosity is designated as $\phi_d$. The circuitry 51 also includes a porosity computing circuit which is responsive to $\phi_N$ and $\phi_D$ to produce a signal generally known as $\phi_{ND}$ that incorporates information from both the neutron and density log readings to obtain an indication of formation total porosity, designated $\phi_t$. In this regard, see, for example, the U.S. Pat. No. 3,590,228. In embodiments hereof, the water-filled porosity $\phi_w$ of the formations is obtained, and can then be utilized to obtain an indication of water saturation from equation (2).

The investigating apparatus includes a further device 44 which is a gamma ray logging device for measuring the natural radioactivity of the formations. The device 44, as known in the art, may typically include a detector, for example a gamma ray counter, which measures the gamma radiation originating in the formations adjacent the detector. An output of circuitry 51 is a signal designated "GR" which represents the gamma ray log reading. If necessary and desired, a clay correction can be applied in the present invention, using the gamma ray log reading.

An electromagnetic propagation tool ("EPT" device) 46 is provided, and includes a pad member 46A that has transmitting and receiving antennas therein. Microwave electromagnetic energy is transmitted through the formations (typically the invaded zone) and formation characteristics are determined by measuring the travel time and attenuation of received energy. This type of logging tool is described in U.S. Pat. No. 3,944,910. Measurements indicative of attenuation, designated ATT, and of travel time (corresponding to phase) designated $t_{p1}$, are available from this tool. The manner in which these measurements can be used to derive formation parameters is described, for example, in "Electromagnetic Propagation Logging: Advances In Technique And Interpretation", by R. Wharton et al., SPE 9267. The dielectric permittivity and conductivity of the formation (generally the invaded zone), as determined from the EPT device, and designated $\epsilon_{EPT}$ and $\sigma_{EPT}$, respectively, can be obtained from $$\epsilon_{EPT} = .3 t_{p1}^2 - \left(\frac{ATT}{200}\right)^2 \quad (4)$$

$$\sigma_{EPT} = 0.003 t_{p1} \cdot ATT \quad (5)$$

where the attenuation has been previously corrected for spread loss. The processing circuitry for developing these logged values is contained within the processing circuitry 51, and $\epsilon_{EPT}$ and $\sigma_{EPT}$ are indicated as outputs thereof.

To keep the investigating apparatus 40 centered in the borehole, extendable wall-engaging members 41B, 43B and 46B may be provided opposite the members 41A, 43A and 46A. For centering the upper portion of the investigating apparatus, centralizers 49 may also be provided. It will be understood that various alternative means can be provided for arranging, configuring, and mounting the devices shown, or similar devices.

The signal outputs of block 51 are illustrated in FIG. 1 as being available to computing module 500 which, in the present embodiment, is implemented by a general purpose digital computer, such as a model PDP-11 sold by Digital Equipment Corp. It will be understood, however, that a suitable special purpose digital or analog computer could alternatively be employed. The outputs of the computing module 500, illustrated in FIG. 1, are signal values developed in accordance with techniques described hereinbelow. These signals are recorded as a function of depth on recorder 90, which generically represents graphical, electrical and other conventional storage techniques.

While all of the measurements to be used in practising the invention are shown, for ease of explanation in the illustrative embodiments, as being derived from a single exploring device, it will be understood that these measurements could typically be derived from a plurality of exploring devices which are passed through the borehole at different times. In such case, the data from each run can be stored, such as on magnetic storage media, for subsequent processing consistent with the principles of the invention. Also, the data may be derived from a remote location, such as by transmissive therefrom.

Before further describing operation of the embodiments hereof, the background theory and underlying theory will be discussed:

There has previously been set forth the so-called "iterated-dilute-limit" method of representing the electrical propeties of a mixture of materials (see Sen, Scala, and Cohen "A Self-Similar Model For Sedimentary Rocks With Application To The Dielectric Constant Of Fused Glass Beads", Geophysics, Vol. 46, No. 5). In this method, one starts with all water, and adds infinitesimal amounts of insulating (e.g. quartz) grains of a specified shape. Successive integrations are performed, up to a solid fraction (1-porosity) of interest. Starting with water as a host ensures that the "rock" (mixture) remains conducting down to very low porosities. In the referenced Sen et al. paper, the expression set forth for the incremental complex dielectric constant, in a particular case wherein the grains are spherical, is $$\frac{d\epsilon^*}{3\epsilon} = \frac{dv}{v + V} \cdot \frac{\epsilon_m - \epsilon^*}{\epsilon_m + 2\epsilon^*} \quad (6)$$

where $V$ and $v$ are the total volume of water and rock, respectively, $\epsilon^*$ is the complex dielectric permittivity of the rock ($\epsilon^* = \epsilon' + j\sigma/\omega\epsilon_0$, with $\sigma$ the conductivity, $\omega$ the angular frequency, and $\epsilon_o$ the dielectric permittivity of free space) and $\epsilon_m$ is the dielectric permittivity of the grain materials (matrix). The volume fraction of the rock matrix is $$\psi = \frac{v}{v + V} \quad (7)$$

and differentiating (7) gives $$d\psi = (1 - \psi) \frac{dv}{V + v} \quad (8)$$

Using equation (8) in equation (6) gives $$\frac{d\epsilon^*}{3\epsilon^*} = \frac{d\psi}{1 - \psi} \frac{\epsilon_m - \epsilon^*}{\epsilon_m - 2\epsilon^*} \quad (9)$$

Integrating expression (9) from $\Psi = 0$ to $\Psi = 1 - \phi$, with the boundary condition that $\epsilon^* = \epsilon_w^*$ (the complex dielectric constant of water) for $\Psi = 0$, gives $$\left(\frac{\epsilon_m - \epsilon^*}{\epsilon_m - \epsilon_w^*}\right) \left(\frac{\epsilon_w^*}{\epsilon^*}\right)^{\frac{1}{3}} = \phi \quad (10)$$

It was noted that high aspect ratio plate-shaped grains can give rise to a large value of the rock's dielectric permittivity. Because of their geometry, the platey grains collect charge, and the charge polarizations can have a profound effect on the complex dielectric constant of the rock. General expressions were developed for cases of particles of different shapes, sizes, and orientations. (See Sen, "Relation Of Certain Geometrical Features To The Dielectric Anomaly Of Rocks", Geophysics, Vol. 46, No. 12; and Mendelson and Cohen, "The Effect Of Grain Anisotropy On The Electrical Properties Of Sedimentary Rocks", Geophysics, Vol. 47, No. 2).

For a distribution of grain depolarization ratios L, the following expression was set forth $$-\frac{d\phi}{3\phi} = \frac{d\epsilon^*}{\epsilon^*(\epsilon_m - \epsilon^*)} \left( \frac{1}{\frac{(1 + 3L)\epsilon_m + (5 - 3L)\epsilon^*}{[L\epsilon_m + (1 - L)\epsilon^*][(1 - L)\epsilon_m + (1 + L)\epsilon^*]}} \right), \quad (11)$$

the angular brackets denoting an average over the distribution of L-values. As frequency decreases, the conductivity term is the major contribution to the complex dielectric constant. In the D.C. limit, equation (11) above gives $$m\frac{d\phi}{\phi} = \frac{d\sigma(0)}{\sigma(0)} \quad (12)$$

and, by integration, gives Archie's law $$\sigma(0) = \sigma_w(0)\phi^m \quad (13)$$

where $\sigma_w(0)$ is the D.C. conductivity of water, $\sigma(0)$ is the D.C. conductivity of the formation, and m, the cementation exponent is $$m = \left( \frac{5 - 3L}{3(1 - L^2)} \right), \quad (14)$$

For a single value of L, averaging is redundant, and the following expression is obtained by integrating equation (11):

$$\ln \phi = \frac{3L(1 - L)}{1 + 3L} \ln \frac{\epsilon_w}{\epsilon^*} + \ln \left[ \frac{\epsilon^* - \epsilon_m}{\epsilon_w - \epsilon_m} \right] + \\
\cdot \frac{2(1 - 3L)^2}{(1 - 3L)(5 - 3L)} \ln \frac{(5 - 3L)\epsilon_w + (1 + 3L)\epsilon_m}{(5 - 3L)\epsilon^* + (1 + 3L)\epsilon_m} \quad (15)$$

However, models with a single particle shape have been found to not provide an adequate representation of the formations. More general models, such as for an arbitrary probability distribution of grains of different aspect ratios, lead to forms of equation (11) which do not lend themselves well to integration and can lead to relationships with too many variables for efficiently representing the formation properties. Such general approaches have not led to a satisfactory model of the formation properties.

In the model used in the present embodiment of the invention, the rock matrix is assumed to comprise two types of grains; i.e. spherical grains and platey grains. The infinitesimal amounts of grains added to water at each step include both spherical grains and platey grains, which are ellipsoids of revolution in this model, with a fixed aspect ratio (i.e., ratio of length to width). The grains are assumed to be uniformly distributed in orientation, so the model is isotropic. Accordingly, the bimodal model has two geometrical parameters; the fraction p of the matrix which is platey grains, and the particle depolarization ratio, L which describes the electrical effect of the particle aspect ratio. The unity complement of L is $\delta = 1 - L$, and this is the parameter used below. [It is known that if L is the depolarization factor along the principal axis, $L_1 = L$ and $L_2 = L_3 = (1 - L_2)/2$, and if $a_1$, $a_2$, and $a_3$ are the semimajor axes, then for an oblate spheroid $$L = \frac{1 - e^2}{2e^3} \left[ \ln \frac{1 + e}{1 - e} - 2e \right], \quad e = [1 - (a_2/a_1)^2]^{\frac{1}{2}} \quad (16)$$

For spherical grains: $L = \frac{1}{3}$.]

Figure 2:
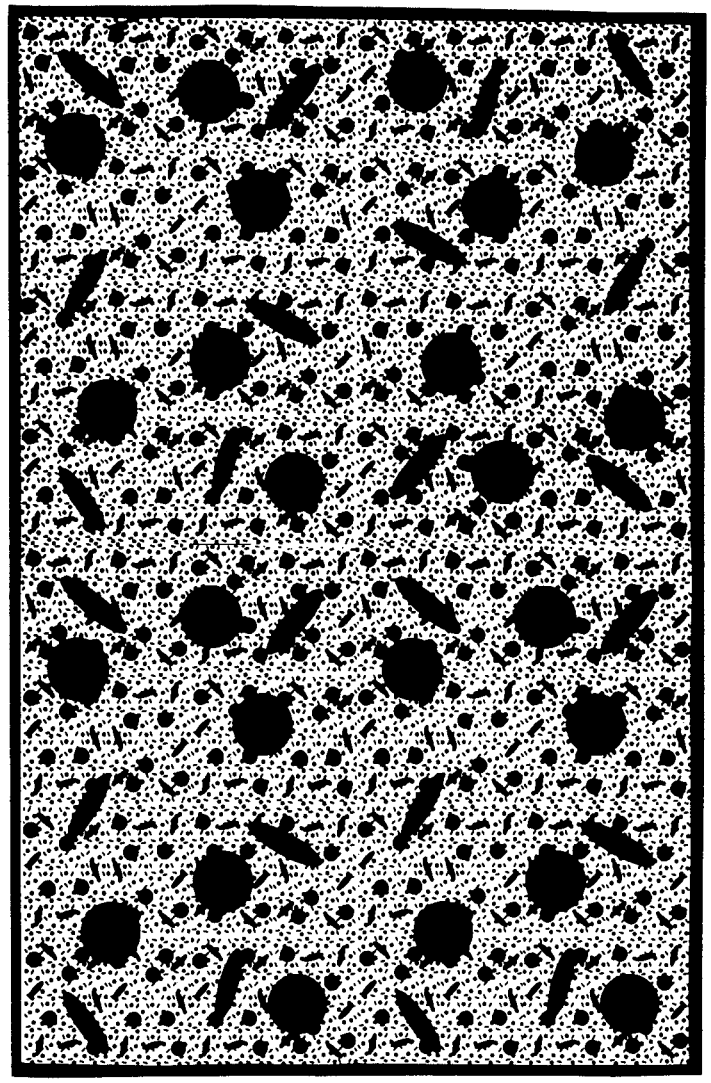
FIG. 2 is a simplified diagram of a bimodal model of a formation matrix.

A simplified pictorial representation of the bimodal model geometry used in the embodiments hereof is shown in FIG. 2. The black circles and ovals represent grains, and the white space represents water. Each size of particle represents one step in the iterated-dilute-limit method. In the illustration of the FIGURE, a 3-step approximation (i.e., 3 particle sizes) of the actual method is shown. In the integration, each particle size is considered to see the effective medium resulting from the previous steps, rather than the actual particles involved in those steps. This effective medium approximation is valid if the particles added at each step are much larger than those of the preceding step.

For the stated bimodal model, with a value of $L = 1 - \delta$ with a probability p for the platey grains, and a value $L = \frac{1}{3}$ with a probability 1-p for spherical grains, (8) above gives $$-\frac{d\phi}{3\phi} = \frac{d\epsilon^*}{\epsilon^*(\epsilon_m - \epsilon^*)} \frac{(\epsilon_m + 2\epsilon)[(1 - \delta)\epsilon_m + \delta\epsilon][\delta\epsilon_m + (2 - \delta)\epsilon^*]}{9(1 - p)[(1 - \delta)\epsilon_m + \delta\epsilon^*][\delta\epsilon_m + (2 - \delta)\epsilon^*] + p(\epsilon_m + 2\epsilon^*)[(4 - 3\delta)\epsilon_m + (2 + 3\delta)\epsilon^*]} \quad (17)$$

Expression (17) can be integrated by partial fractioning to give $$\phi^{-\frac{1}{3}} = \quad (18)$$

$$\left( \frac{\epsilon^*}{\epsilon_w^*} \right)^{P_1} \left( \frac{\epsilon^* - \epsilon_m}{\epsilon_w^* - \epsilon_m} \right)^{P_2} \left( \frac{\epsilon^* - \epsilon_1}{\epsilon_w^* - \epsilon_1} \right)^{P_3} \left( \frac{\epsilon^* - \epsilon_2}{\epsilon_w^* - \epsilon_2} \right)^{P_4}$$

where the coefficients and complex coefficients are $$P_1 = \frac{\delta(1 - \delta)}{9(1 - p)\delta(1 - \delta) + p(4 - 3\delta)}$$

$$P_2 = -\frac{1}{3}$$

$$P_3 = \frac{(\epsilon_m + 2\epsilon_1)[(1 - \delta)\epsilon_m + \delta\epsilon_1][\delta\epsilon_m + (2 - \delta)\epsilon_1]}{\epsilon_1(\epsilon_m - \epsilon_1)g_1(\epsilon_1 - \epsilon_2)}$$

$$P_4 = \frac{(\epsilon_m + 2\epsilon_2)[(1 - \delta)\epsilon_m + \delta\epsilon_2][\delta\epsilon_m + (2 - \delta)\epsilon_2]}{\epsilon_2(\epsilon_m - \epsilon_2)g_1(\epsilon_2 - \epsilon_1)}$$

$$\epsilon_{1,2} = -\frac{g_2}{2g_1} \pm \sqrt{\frac{g_2^2 - 4g_1g_3}{4g_1^2}}$$

$$g_1 = 9(1 - p)\delta(2 - \delta) + p(4 + 6\delta)$$
$$g_2 = \{9(1 - p)(2\delta^2 - 3\delta + 2) + p(10 - 3\delta)\}\epsilon_m$$
$$g_3 = \{9(1 - p)\delta(1 - \delta) + p(4 - 3\delta)\}\epsilon_m^2$$

In the low frequency limit, expression (18) gives Archie's law (e.g. equation (13)), but with $$m = \frac{3}{2}(1-p) + \frac{p}{3\delta} \cdot \frac{2+3\delta}{2-\delta} \quad (19)$$

Figure 3:
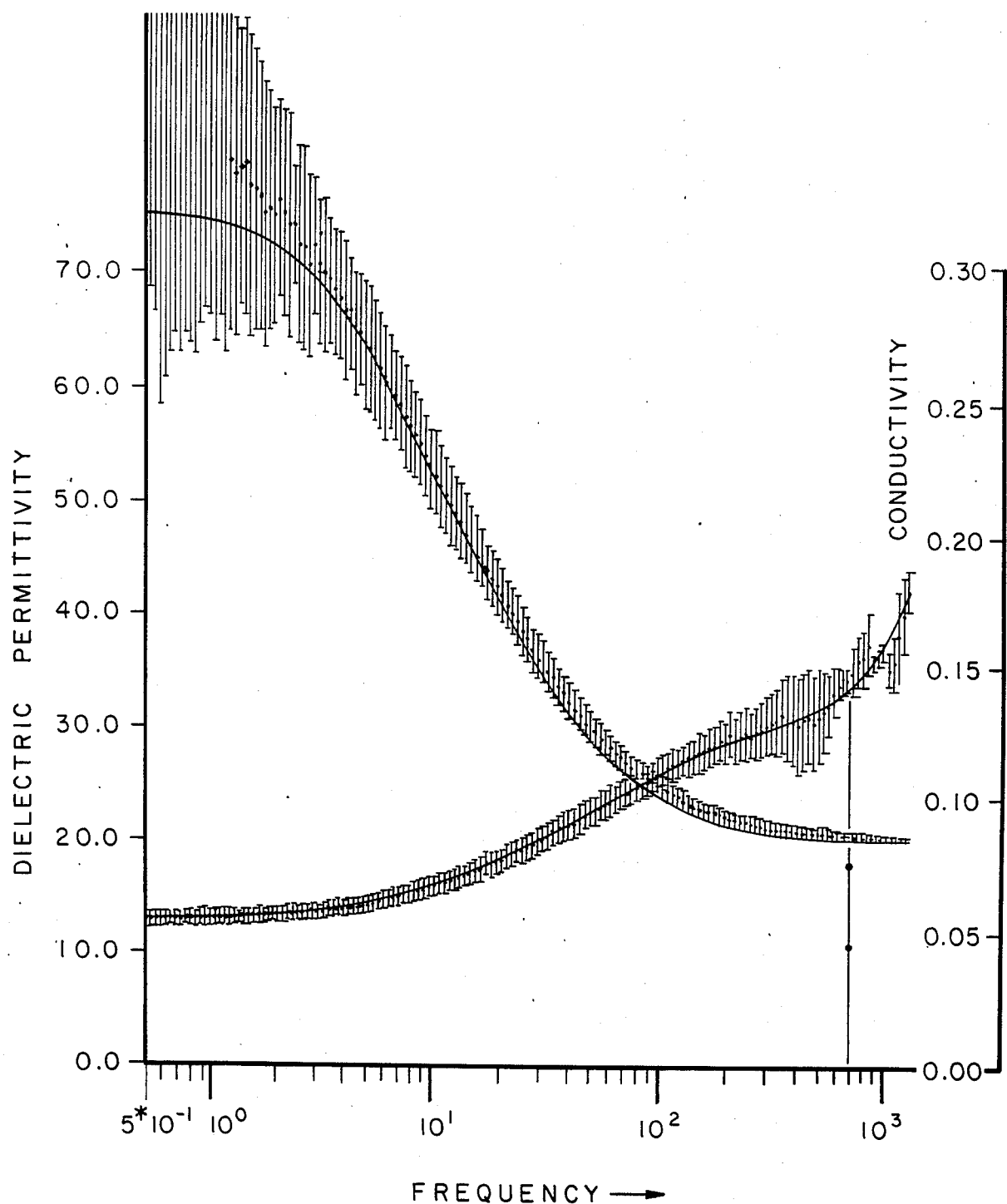
FIG. 3 illustrates measured values of dielectric permittivity and conductivity of a rock sample, as compared to values of dielectric permitivity and conductivity obtained from a bimodal model.

Referring to FIG. 3, there are shown curves, based on the bimodal model of the relationship (18), of dielectric permittivity vs. frequency and conductivity vs. frequency for a water-filled rock sample from a carbonate that is primarily calcite. In this example the rock sample used had a water-filled porosity, $\phi_w$, of 0.3, a matrix dielectric permittivity $\epsilon_m$ of 7.4, a water conductivity $\sigma_w$ of 1.07 ohm-meters, and a water dielectric permittivity $\epsilon_w$ of 78. At one frequency (10 Mhz in this example) the dielectric permittivity $\epsilon'$ and the conductivity $\sigma$ of the composite rock were measured. The known and measured values were then used in relationship (18), which was solved using Newton's method to determine values for p (fraction of platey grains) and $\delta$ (which depends on the aspect ratio of the platey grains). These determined values for p and $\delta$ were then used in the relationship (18), at each frequency, to compute a value of $\epsilon'$ and $\sigma$ at each such frequency. The result was the solid line curves for dielectric permittivity $\epsilon'$ and conductivity $\sigma$ shown in FIG. 3. Actual measurements on the composite sample at the various frequencies, taken by measuring phase shift and lossiness of the sample and computing $\epsilon'$ and $\sigma$ using known techniques are shown by the individual points of the FIGURE. These are seen to correspond quite well with the (solid line) curve values computed from the bimodal model relationship (18).

The dielectric measurements of the FIG. 3 example were made, at room temperature, by measuring the reflection and transmission characteristics of the sample in a sample cell using a network enelayzer (see M. S. Freedman et al., J. Phys. E:Sci. Inst. 12,899, (1979)). The sample cell consisted of a section of coaxial waveguide in which the rock sample constituted the dielectric medium between inner and outer conductors of the waveguide. Teflon plugs at each end of the sample were used as seals to contain the water content in the sample. The dielectric constant and conductivity of the sample were computed using both forward and reverse scattering parameters. (See, for example, Palaith & Chang, "Improved Accuracy For Dielectric Data", The Institute For Physics, 1983.) In FIG. 3 the size of the uncertainty bar associated with each point was derived using the manufacturer's stated accuracy for the equipment at each frequency.

Figure 4:
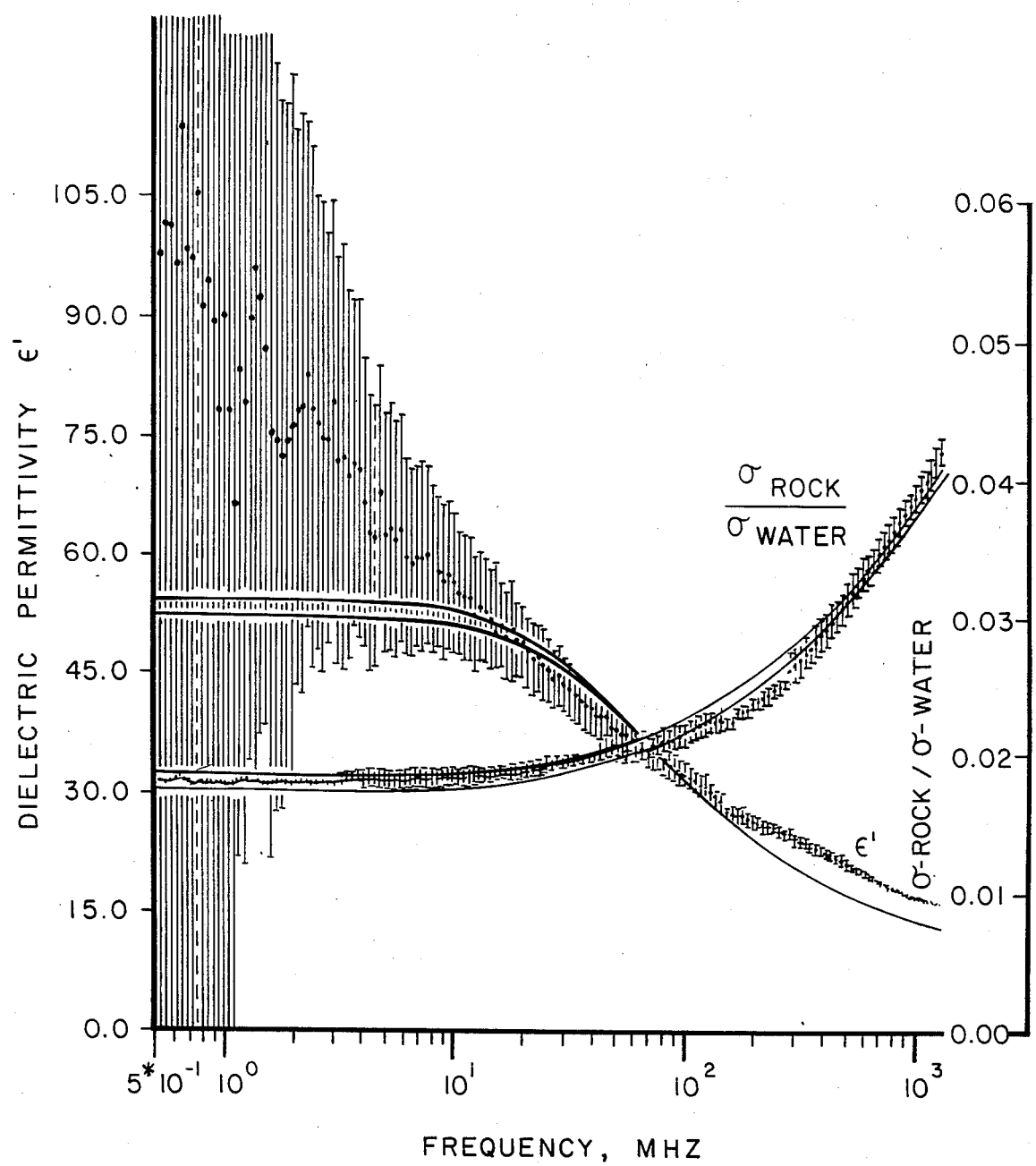
FIG. 4 is another graph of dielectric permittivity and conductivity of a rock sample, as compared to values of dielectric permitivity and conductivity obtained from a bimodal model, with the computed values being obtained for different fitting frequencies.

FIG. 4 is another diagram which shows measured values of dielectric permittivity, $\epsilon'$, and conductivity, $\sigma/\sigma_w$ in this case, for a carbonate rock which is primarily dolomite. In this example, $\phi_w$ was 0.13, $\epsilon_m$ was 6.8, $\epsilon_w$ was 47, and $\sigma_w$ was 19.6 ohm-meters. A relatively high salinity was used to minimize the fractional contribution of surface conductivity effects, such as polarization of a double layer around charged particles such as clays, when present. The measurements were made in a manner similar to that described in conjunction with FIG. 3, and the solid line curves were also generated from the bimodal model in the manner previously described. It will be recalled that the solid line curves of FIG. 3 were generated by using the measurements at one frequency (10 Mhz in that case), and then using the bimodal model relationship (18) to determine textural parameters p and $\delta$. These were, in turn, used in the bimodal model relationship to determine the dielectric permittivity and the conductivity at each frequency. It will be understood that the textural parameters in these examples depend, to some degree, on the frequency at which one chooses to calculate them. In the example of FIG. 4, two frequencies, 10 Mhz and 100 Mhz, were used, thereby resulting in two curves for dielectric permittivity and two curves for conductivity, as shown. The curves determined from the bimodal model, at both generation frequencies, are seen to again match quite well to the measurements; not as closely for dielectric permittivity at lower frequencies, although still generally within the vertical error bars associated with the measurements.

Figure 5:
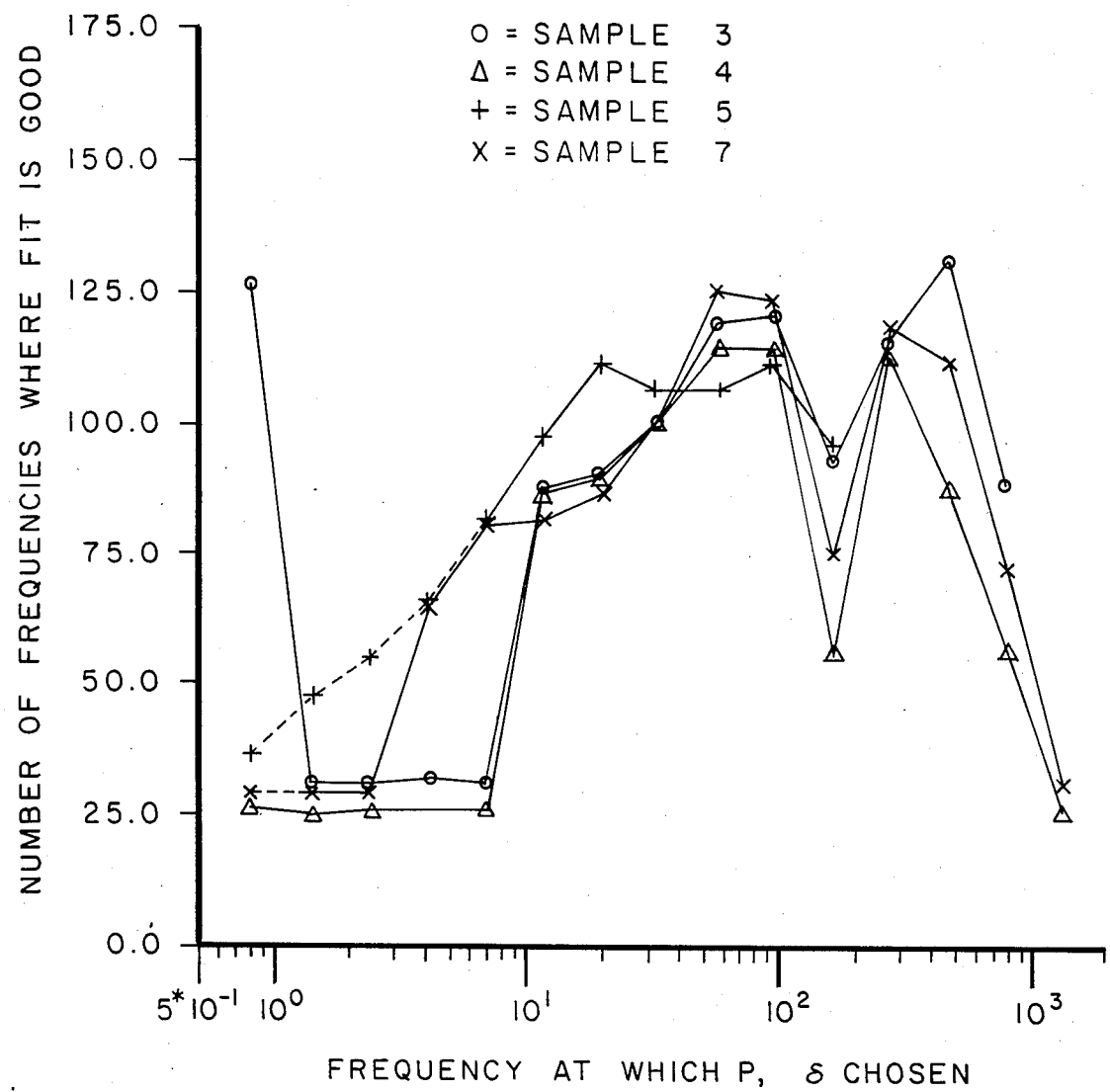
FIG. 5 is a plot of "quality of fit" between measurements of dielectric permittivity and values of dielectric permittivity as obtained from a bimodal model for a number of different samples at different fitting frequencies.

FIG. 5 illustrates the dependence on frequency of the method used in obtaining the bimodal model curves of FIG. 4. Curves are shown for four different carbonate (primarily dolomite) rock samples in this FIGURE, identified as sample numbers 3, 4, 5 and 7. In this particular example, measurements were made at 151 different frequencies for each sample. Accordingly, the so-called "quality of fit" scale on the vertical axis of FIG. 5 goes up to a maximum value of 151. The plot shows the number of measurement frequencies at which the model value of dielectric permittivity fit inside the error bars.

Figure 6:
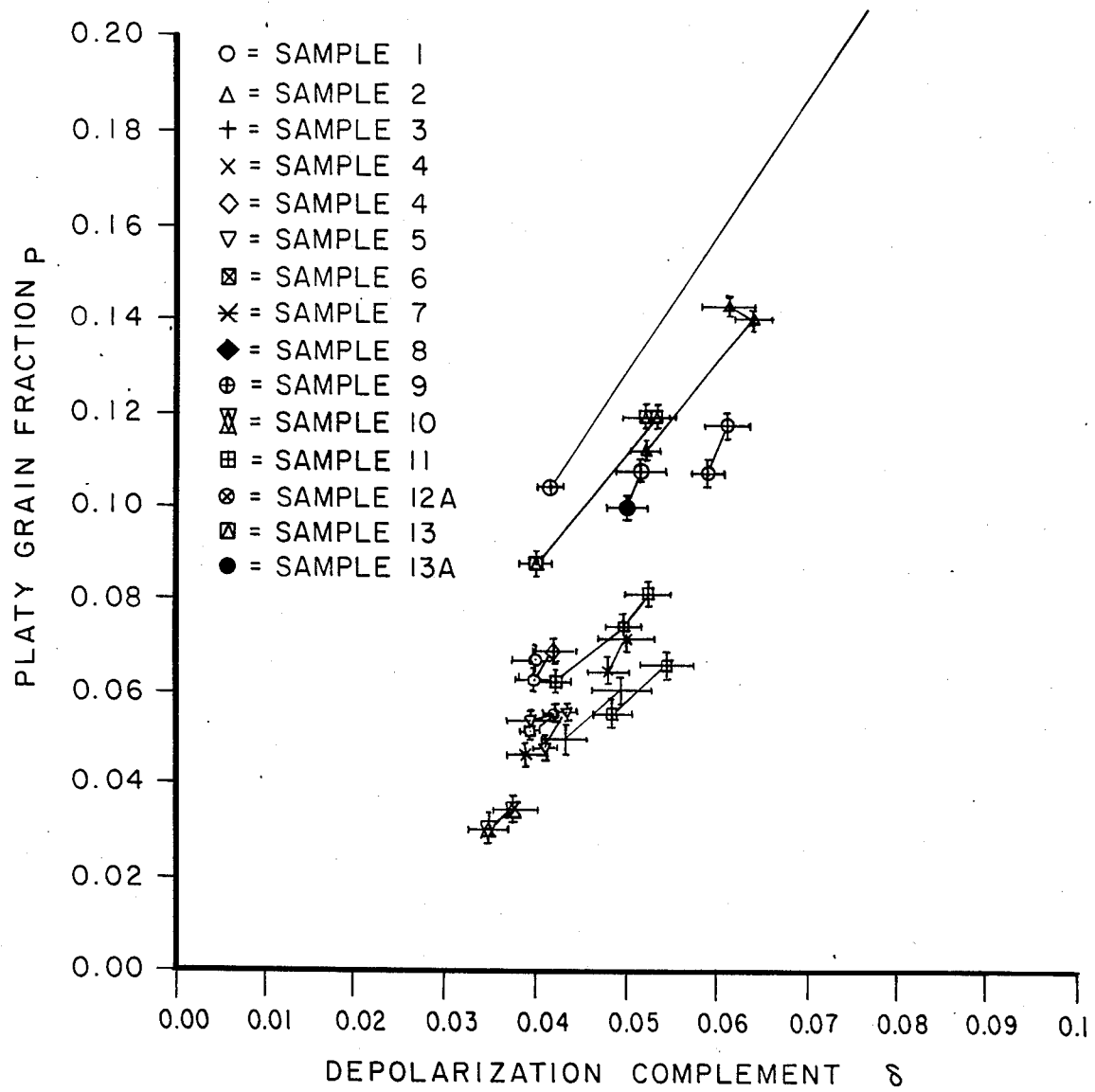
FIG. 6 is a plot of platey grain fraction and depolarization complement for a number of samples at local maxima of a "quality of fit" curve for each sample.

FIG. 6 illustrates the values of the platey grain fraction p and the depolarization complement $\delta$ at the local maxima of the "quality of fit" curves (e.g. FIG. 5) for ten carbonate rock samples identified as sample numbers 1 through 13A (sample 10 had been utilized in the FIG. 4 example). Each sample had two or more local maxima, which are connected by solid lines. The length of the horizontal bar associated with each point is indicative of the fitting frequency (a wider bar indicating a higher frequency). The height of the vertical bar associated with each point is indicative of the relative value of the "quality of fit" (a taller bar indicating a better fit). Sample 1 produced an anomolous result, with the largest maximum off the page for the scale shown. Platey grain fractions p of about 0.08 and depolarization complements $\delta$ of about 0.05 are representative.

Figure 7:
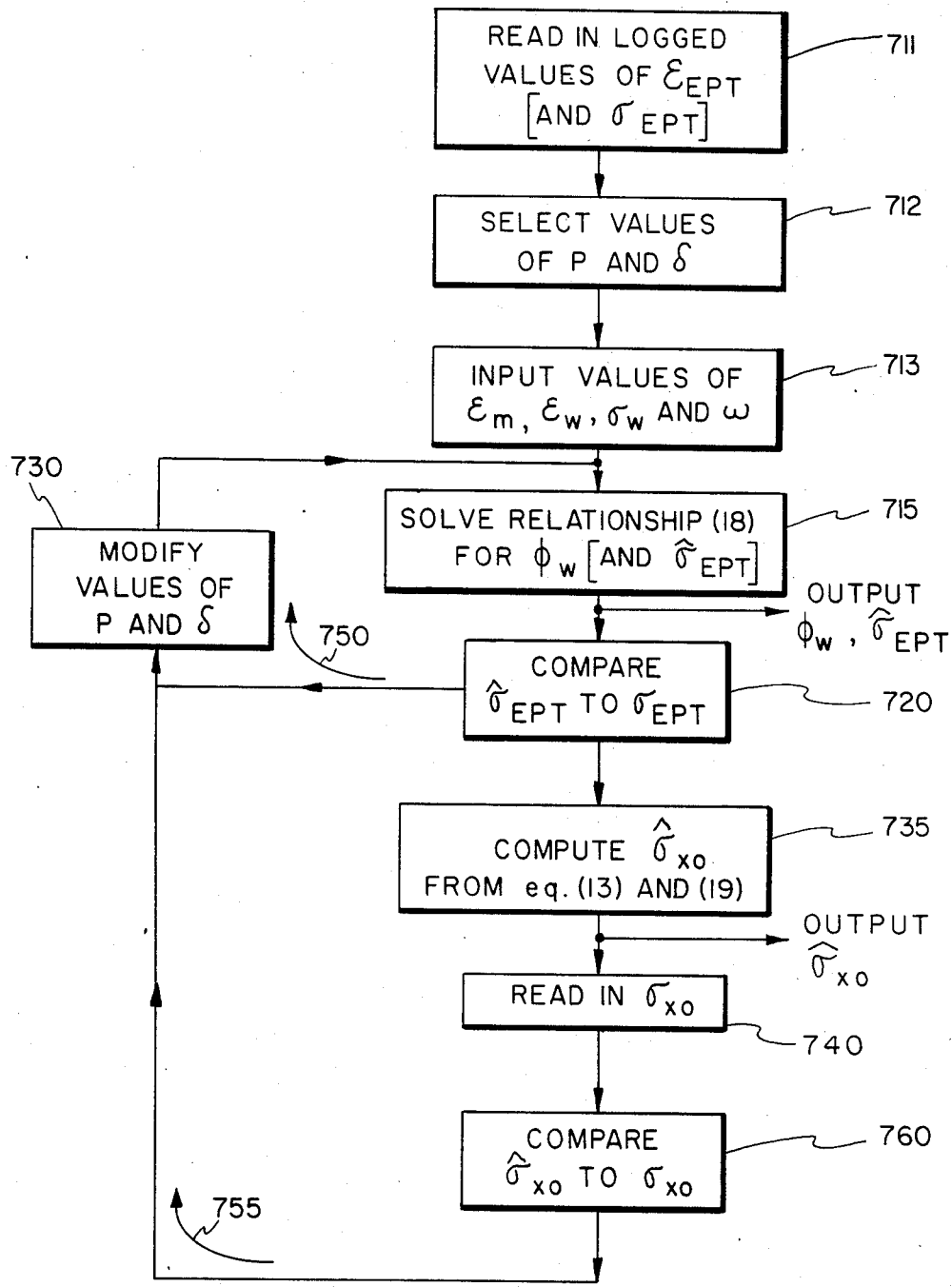
FIG. 7 is a flow diagram of a routine for programming a processor to obtain output signals in accordance with an embodiment of the invention.

Referring to FIG. 7, there is shown a flow diagram of a routine for determining the water-filled porosity, $\phi_w$, and other properties, of the formations using a form of the invention. Briefly, the routine of FIG. 7 operates as follows: The dielectric permittivity and conductivity from the "EPT" logging device are read in. Parameters representative of rock texture, i.e., p and $\delta$, are selected, e.g., by using representative values from a plot such as FIG. 6. The "EPT" logging device is generally operative to obtain measurements on the formation invaded zone, and certain characteristics of the invaded zone, such as the dielectric permittivity of the invading fluid, $\epsilon_w'$, and the conductivity of the invading fluid, $\sigma_w$, are known with fairly good accuracy. Also, the matrix dielectric permittivity, $\epsilon_m$, is known with some confidence, and the operating angular frequency, $\omega$, is, of course, known. Accordingly, relationship (18) can be solved to obtain the water-filled porosity, $\phi_w$. The bimodal model relationship (18) can be used to obtain "reconstructed" or "quality check" values of the formation (invaded zone) conductivity, at the EPT frequency (designated $\hat{\sigma}_{EPT}$) and at low (which includes D.C.) frequency (designated $\hat{\sigma}_{xo}$). These reconstructed values can then be utilized for comparison with measured values. If desired, the bimodal model textural parameters can then be modified and the procedure continued until the reconstructed values are sufficiently close to the measured values; whereupon a revised $\phi_w$ is obtained and recorded.

In FIG. 7, the block 711 represents the reading in of logged values for $\epsilon_{EPT}$ and $\sigma_{EPT}$ from processing circuitry 51. [$\sigma_{EPT}$ is shown parenthetically in the block since, in this embodiment, $\sigma_{EPT}$ is not originally input as a logged value, but is allowed to vary.] The measured value $\sigma_{EPT}$ is used as the standard of comparison in the quality check portion of the routine. As previously indicated, values for the dielectric permittivity and the conductivity of the formations are obtained from the "EPT" device 46 log readings in accordance with the relationships (4) and (5) above.

The block 712 represents the selection of the textural parameters p and $\delta$ of the bimodal model; that is, the fraction of platey grains, and the unity complement of the platey grain polarization L (which depends on the aspect ratio of the platey grains). If available, core measurements and/or other information can be used to initially estimate the textural parameters, p and $\delta$, such as from a plot like that of FIG. 6. If not, for a carbonate formation, an initial average value of p=0.08, $\delta$=0.05 can be utilized.

The block 713 is next entered, this block representing the inputting of fixed values for the dielectric permittivity of the matrix (grain) material, $\epsilon_m$, the conductivity and dielectric permittivity of the fluid (which, for the invaded zone may be the values for the invading fluid), $\sigma_w$ and $\epsilon_w'$, respectively, and the angular frequency, $\omega$, of the logging device. In the present embodiment, the logging device used is the "EPT" device 46 of FIG. 1, operating at a frequency of 1100 MHz, although it will be understood that other devices and/or frequencies can be employed.

The block 715 represents the solving of the bimodal model relationship (18) for porosity $\phi_w$ and "reconstructed" conductivity $\hat{\sigma}_{EPT}$. From relationship (18) it will be understood that there are two unknowns in the present embodiment; namely, the porosity $\phi_w$, and the formation conductivity, $\sigma$. Since relationship (18) is complex, it contains an equation for the real part and an equation for the imaginary part, and these can accordingly be solved for the two unknowns. Solution can be implemented, for example, using Newton's method. The values obtained are output to recorder 90. The value of $\sigma$ solved for is $\hat{\sigma}_{EPT}$, which is utilized as a quality check as against the originally input value of $\sigma_{EPT}$ (comparison block 720). If these conductivity values closely correspond, it is an indication of the accuracy of the textural parameters used, and the water-filled porosity $\phi_w$ that has been obtained. For substantial differences between $\hat{\sigma}_{EPT}$ and $\sigma_{EPT}$, the textural parameters, p and $\delta$, can be modified (block 730) and the loop 750 can be iteratively continued until $\hat{\sigma}_{EPT}$ approaches $\sigma_{EPT}$ whereupon a modified water-filled porosity, $\phi_w$, can be read out and recorded.

Another quality check that can be performed in accordance with the present embodiment pertains to the invaded zone conductivity, $\sigma_{xo}$. In particular, the determined value of porosity, $\phi_w$, can be used in conjunction with a cementation value m, that is determined from the textural parameters in accordance with the low frequency bimodal model relationship (19) of the Archie law (13), to obtain a "quality check" or "reconstructed" value of invaded zone conductivity, $\hat{\sigma}_{xo}$ (block 735). This value can be compared, for example, against the value of invaded zone conductivity $\sigma_{xo}$ measured by a low frequency logging device, such as the device 41 of FIG. 1, and read in, as represented by the block 740. The comparison, as represented by the block 760, can then be used as a basis for modifying the textural parameters, as previously described, (and as represented by block 730), to improve the textural parameters of the bimodal model. The loop 755 can then continue until a satisfactory modified porosity value is obtained. It will be understood that none, one, or both quality checks can be employed, as desired, and it will also be understood that the quality check parameters can be used as recorded logged output values, if desired.

Figure 8:
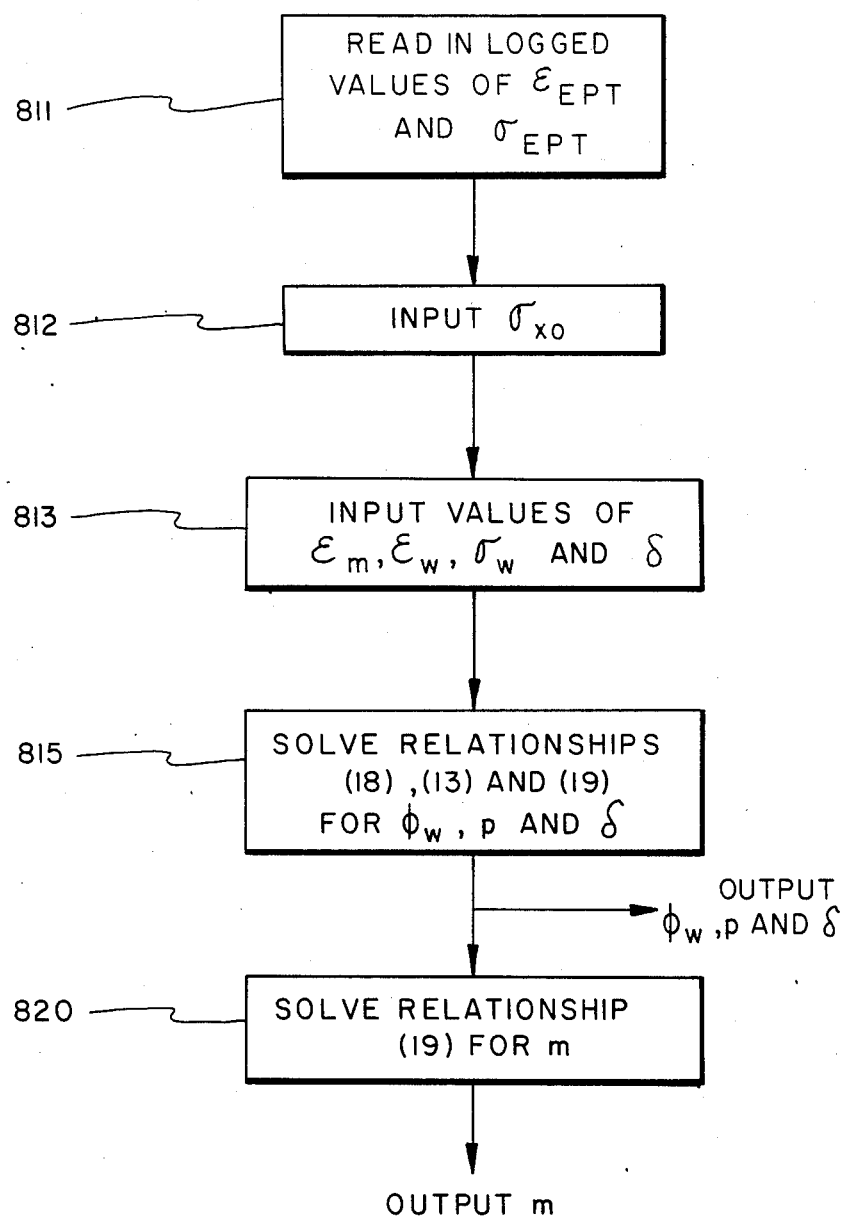
FIG. 8 is a flow diagram of a routine for programming a processor to obtain output signals in accordance with another embodiment of the invention.

FIG. 8 is a flow diagram of a routine for obtaining, as outputs, the water-filled porosity, $\phi_w$, and the textural parameters p and $\delta$ (which, inter alia, can be utilized to obtain a cementation exponent m). The blocks 811 and 812 represent the inputting of logged values of $\epsilon_{EPT}$, $\sigma_{EPT}$ and $\sigma_{xo}$ from the devices 46 and 41 and processing circuitry 51, as previously described. In the present embodiment, however, $\sigma_{EPT}$ and $\sigma_{xo}$ are utilized directly in the bimodal model, rather than for quality check. Input as fixed values in this embodiment, as represented by the block 813, are the matrix (grain) dielectric permittivity, $\epsilon_m$, the conductivity and dielectric permittivity of the invading fluid $\sigma_w$ and $\epsilon_w'$, respectively, and the angular frequency $\omega$ of the "EPT" logging device.

Accordingly, it is seen that in this embodiment there are three unknowns ($\phi_w$, p and $\delta$), which can be solved for (block 815), such as by using Newton's method, from the following three relationships: The real part of relationship (18), the imaginary part of relationship (18), and the Archie relationship (13) (including the exponent portion from the low frequency version of the bimodal model relationship, as represented by equation (19)). The values of porosity and the textural parameters obtained thereby can be read out and recorded, and the cementation exponent m can be obtained from relationship (19) (block 820), and also recorded, at each depth level.

Figure 9:
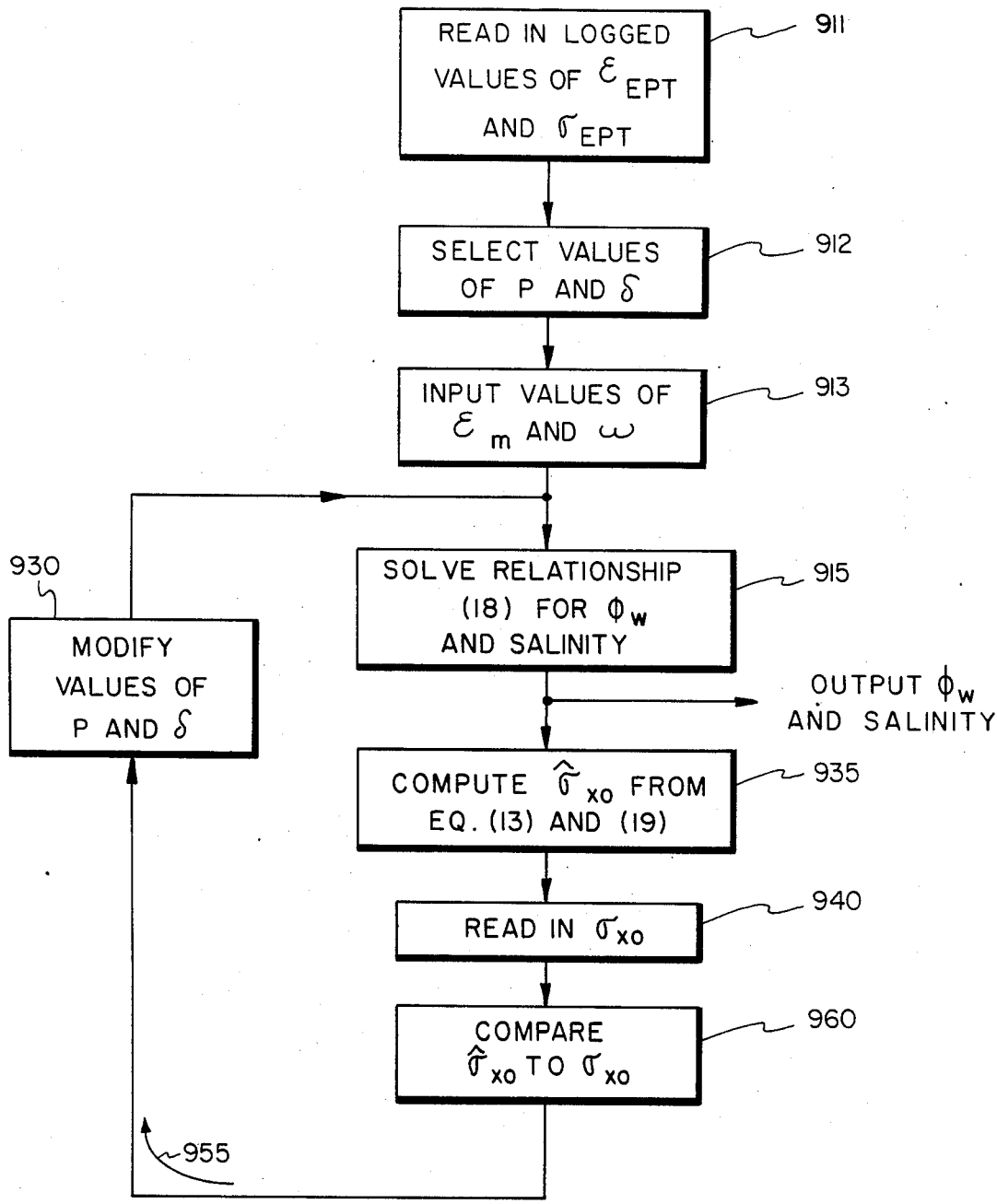
FIG. 9 is a flow diagram of a routine for programming a processor to obtain output signals in accordance with a further embodiment of the invention.

FIG. 9 is a flow diagram of a routine in accordance with a further embodiment of the invention. This embodiment is similar to that of FIG. 7 except that, in this case, the conductivity derived from the "EPT" device, $\sigma_{EPT}$, is used at a direct input instead of a quality check parameter. The block 911 represents the inputting of $\epsilon_{EPT}$ and $\sigma_{EPT}$ from the processing circuitry 51. The textural parameters p and $\delta$ are selected (block 912) as previously described in conjunction with the block 712 of FIG. 7. The dielectric permittivity of the matrix, $\epsilon_m$, and $\omega$ are input, as represented by block 913. In this embodiment, however, the conductivity and dielectric permittivity of the invaded zone fluid, $\sigma_w$ and $\epsilon_w'$, respectively, are not input, but are obtained from the bimodal model, along with the water-filled porosity, $\phi_w$.

In the FIG. 9 embodiment, it is assumed that salinity of the formation invaded zone water is unknown. However, at a given temperature, it is well known that both the conductivity and the dielectric permittivity of the water can be determined from the water salinity. Accordingly $\epsilon_w'$ and $\sigma_w$ can be considered as involving a single unknown; i.e. the water salinity. Therefore, the real and imaginary parts of equation (19) can be solved for $\phi_w$, $\sigma_w$ and $\epsilon_w'$ (as represented by the block 913), the values of which are recorded, as shown.

In the FIG. 9 embodiment the blocks 935, 940, 960 and 930 operate, in a manner similar to their counterparts 735, 740, 760 and 730, respectively, in FIG. 7, to compute a "reconstructed" $\hat{\sigma}_{xo}$ (block 935), read in the measured $\sigma_{xo}$ (block 940), compare the two (block 960), and modify the textural parameters in accordance with the comparison (block 930). The loop 955 is continued until the reconstructed $\hat{\sigma}_{xo}$ is sufficiently close to the measured value $\sigma_{xo}$; whereupon revised values of $\phi_w$, $\sigma_w$ and $\epsilon_w'$ are obtained and recorded.

Figure 10:
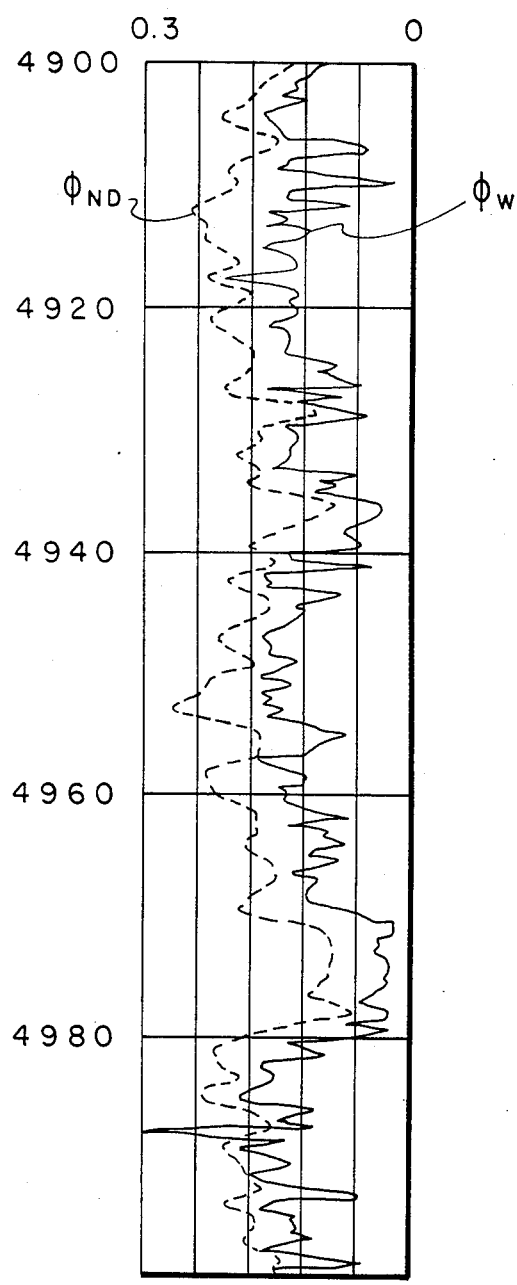
FIG. 10 is a log of water-filled porosity obtained using the bimodal model.

FIG. 10 illustrates an example of a log of water-filled porosity $\phi_w$ (shown in solid line) versus depth for a dolomite well. A fixed platey-grain fraction $p=0.08$ and depolarization complement $\delta=0.05$ were used, and the procedure described in conjunction with FIG. 7 was applied, based on $\epsilon_{EPT}$ log inputs. A neutron-density crossplot porosity $\phi_{ND}$ (shown in dashed line) is shown for comparison. The difference between porosities is due, for the most part, to the presence of residual hydrocarbons in the invaded zone. The $\phi_{ND}$ values represent total porosity, whereas $\phi_w$ represents only the water-filled portion of the porosity, under the simplifying assumption that the dielectric permittivity of oil is close to that of the matrix.

Figure 11:
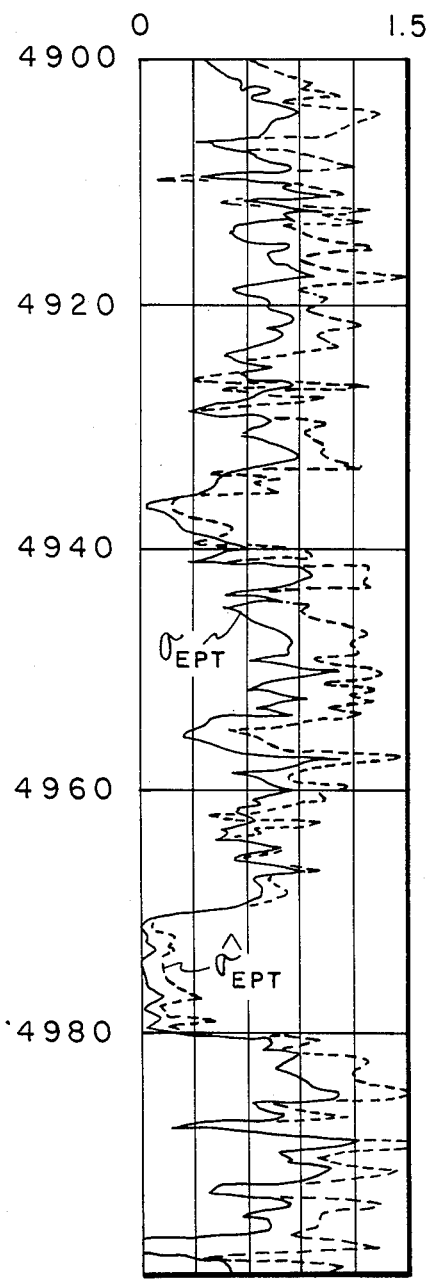
FIG. 11 is a log of reconstructed high frequency conductivity determined using the bimodal model.
Figure 12:
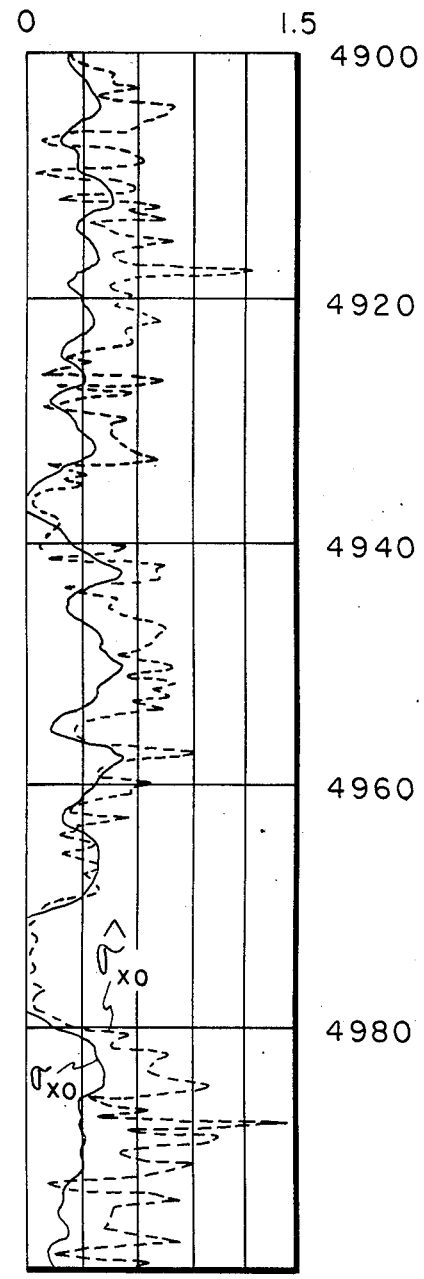
FIG. 12 is a log of reconstructed invaded zone low frequency conductivity.
Figure 13:
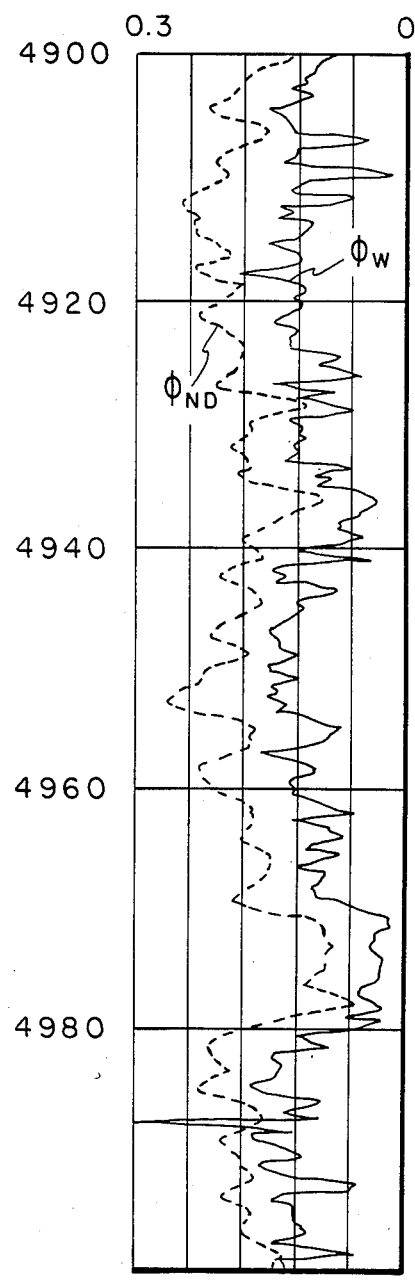

FIG. 11 shows logs of the reconstructed (generally invaded zone) high frequency conductivity $\hat{\sigma}_{EPT}$ (dashed line) and the measured $\sigma_{EPT}$ (solid line), the reconstructed values having been derived using $\sigma_{EPT}$ measurements and texture values of FIG. 10, and again following the procedure described in conjunction with FIG. 7. FIG. 12 shows logs of the reconstructed invaded zone low frequency conductivity $\sigma_{xo}$ (dashed line) and the measured $\sigma_{xo}$ (solid line), the reconstructed values also having been derived using the procedure described in conjunction with FIG. 7; i.e. using the Archie law, with the $\phi_w$ values from FIG. 10 and m from the texture values used for FIG. 10. In this example, the reconstructions were not considered adequate, and FIGS. 13, 14 and 15 respectively show the modified porosity $\phi_w$ and reconstructions $\hat{\sigma}_{EPT}$ and $\hat{\sigma}_{xo}$, with $p=0.1$ and $\delta=0.45$, again consistent with the procedure described in conjunction with FIG. 7. The improvements are evident. In this example, the texture parameters arrived at were used for the zone as a whole. It will be understood that further refinement could be made, for example, through zoning p and $\delta$ from, say, depths 4970 through 4960. In FIG. 13 the difference between porosities is again attributable, for the most part, to residual hydrocarbon in the well. The lower zone below 4980 shows a smaller separation between the two curves, indicating less hydrocarbon is present. This was expected due to water injection into this part of the reservoir.

Figure 16:
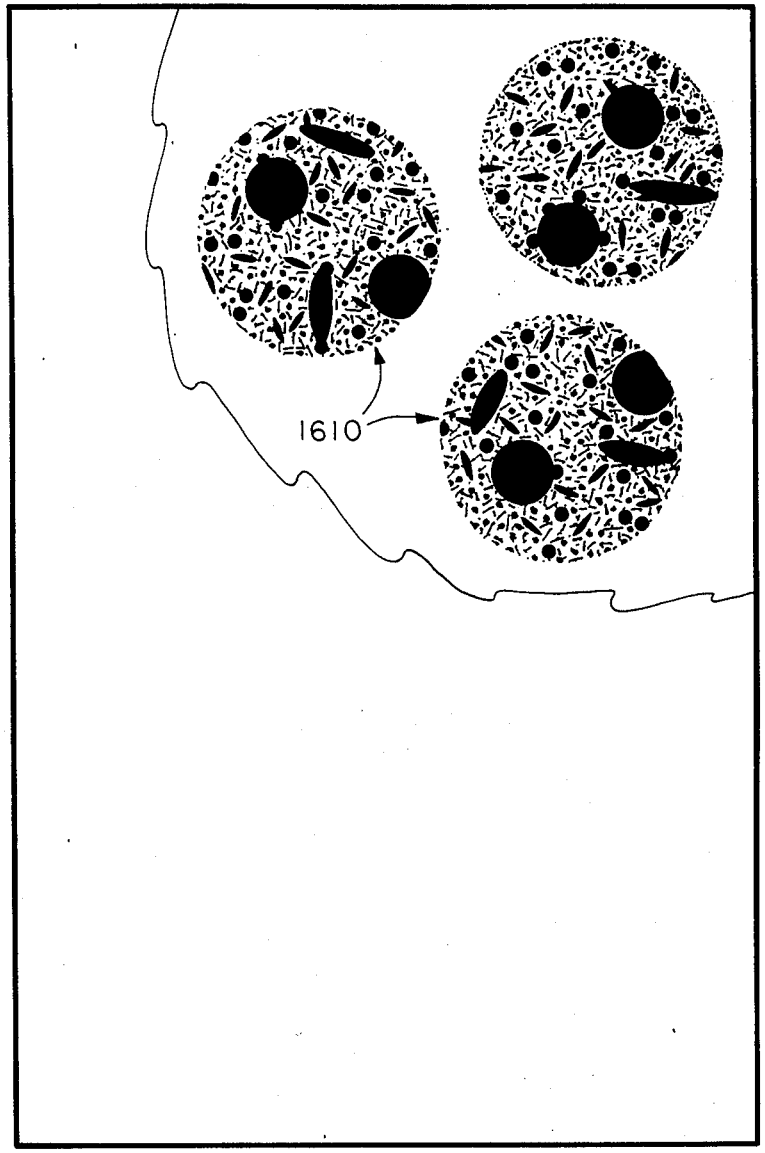
FIGS. 16 and 17 are simplified diagrams representing further forms of textural models of formations.
Figure 17:
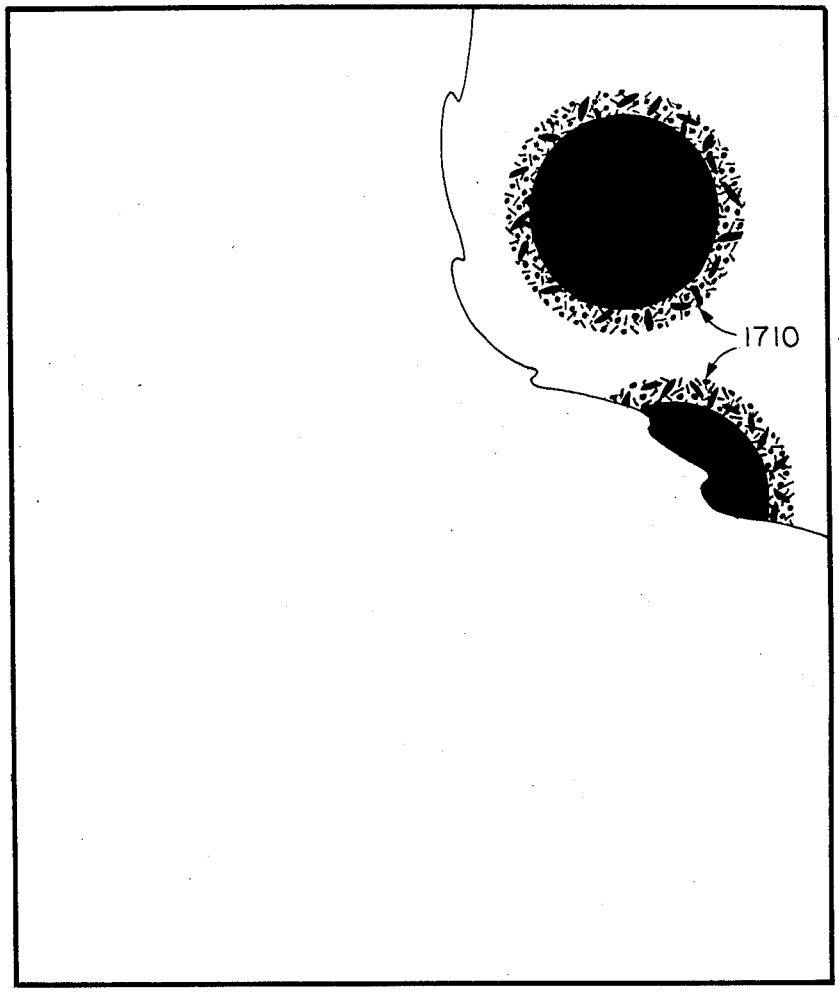

FIG. 2 had set forth a simplified pictorial representation of the bimodal model geometry. FIGS. 16 and 17 show further forms of the bimodal model geometry. In FIG. 16, "chunks" 1610 of the FIG. 2 material (i.e. of spherical grains and platey grains of a single aspect ratio, in water, and having the properties described above), which are spheres in this example, are shown as having been added to water. This model has been found to provide an effective representation of sandstones. If the porosity due to the water between the chunks is designated $\phi_1$, and the porosity in the chunks is designated $\phi_2$, then the total porosity, $\phi$, is $\phi=\phi_1+\phi_2(1-\phi_1)$. The complex dielectric permittivity of the composite rock for this "chunk" model, designated $\epsilon_{chm}^*$, can be represented as $$\epsilon_{chm}^* = \frac{\epsilon_w^*[1 + 2(1-\phi_1)(\epsilon_{ch}^* - \epsilon_w^*)/(\epsilon_{ch}^* + 2\epsilon_w^*)]}{1 - (1-\phi_1)(\epsilon_{ch}^* - \epsilon_w^*)/(\epsilon_{ch}^* + 2\epsilon_w^*)}$$

where $\epsilon_{ch}^*$ is the complex dielectric permittivity of the spherical chunk material. Equations can then be developed, and solved, as above, as a function of porosity, electrical parameters, and textural parameters.

In FIG. 17 there is shown a model in which spherical cores of matrix material are "coated" with a mixture of water and platey grains of a single aspect ratio and different sizes. The coated grains 1710 are added to water, as before. The complex dielectric permittivity of each coated grain, designated $\epsilon_{cg}^*$, can be represented as:

$$\epsilon_{cg}^* = \frac{\epsilon_{ct}^*[3\epsilon_{cr}^* - 2V_{sc}(\epsilon_{cr}^* - \epsilon_{ct}^*)]}{3\epsilon_{ct}^* + V_{sc}(\epsilon_{cr}^* - \epsilon_{ct}^*)}$$

where $V_{sc}$ is the volume fraction of the sphere coating as a fraction of total grain volume $\epsilon_{ct}^*$ is the complex dielectric permittivity of the coating material, and $\epsilon_{cr}^*$ is the complex dielectric permittivity of the grain core material. When the coated spheres are placed in water, the uniform spheroid relationship (e.g. equation (15), etc.) can then be utilized, in similar manner.

In the description so far, the simplifying assumption has been made that any hydrocarbon present is treated the same as the rock matrix material, since the conductivity and electric permittivity are in the same general ranges for these materials. As seen, very useful results can be obtained notwithstanding this simplification. Consider, next, that a oil-water-matrix composite is built up in steps by adding infinitesimal amounts of spheres of matrix and oil into an effective "host" which is the resulting effective medium obtained at the previous step. The change $d\epsilon$ in $\epsilon$ of the complex dielectric constant of the mixture at any stage, due to inclusion $dv_m$ of rock grains and $dv_n$ of hydrocarbon material is given by:

$$\frac{d\epsilon^*}{3\epsilon^*} = \frac{dv_m}{v_m + v_w + v_n} \frac{\epsilon_m - \epsilon^*}{\epsilon_m + 2\epsilon^*} + \frac{dv_n}{v_m + v_w + v_n} \frac{\epsilon_n - \epsilon^*}{\epsilon_n + 2\epsilon^*} \quad (51)$$

This is similar to equation (6) except that now there is an additional term representing hydrocarbon.

In general $dv_m$ and $dv_n$ can have arbitrary relation at each stage of the mixing process, with the only constraint being that the final values of $V_n:V_m:V_w=(1-S_w)\phi:(-\phi):S_w\phi$. Equation (51) can be integrated if a relationship between $dv$ and $dv_n$ is postulated. The simplest case arises if it is assumed that $dv_n/dv_m=v_n/v_m(\text{final})=\eta\equiv(1-S_w)\phi/(1-\phi)$. Thus, the medium in this model is built up by keeping volume of water $v_w$ fixed and adding infinitesimal amounts of matrix and hydrocarbon. Defining the volume fraction of matrix grains at an intermediate stage by $$\psi\equiv v_m[v_w+(1+\eta)v_m]^{-1}, \quad (52)$$

gives $$d\psi=(1-(1+\eta)\psi)[v_w+(1+\eta)v_m]^{-1}. \quad (53)$$

Integrating eq. (51) with $v_n/v_m=\eta$ held fixed and boundary conditions that that $\sigma=\sigma_w$ when $S_w\phi=1$ (with $S_w\rightarrow 1$ being taken first) gives an expression for the effective dielectric constant of the system $\epsilon$ as:

$$S_w\phi = \left(\frac{\epsilon_w}{\epsilon^*}\right)^{\frac{1}{3}} \left(\frac{a\epsilon^{*2} + b\epsilon^* + c}{a\epsilon_w^{*2} + \epsilon_w + c}\right)^{\frac{1}{2}} \left[\frac{(2a\epsilon^* + b - \sqrt{b^2 - 4ac})(2a\epsilon_w + b + \sqrt{b^2 - 4ac})}{(2a\epsilon^* + b + \sqrt{b^2 - 4ac})(2a\epsilon_w + b - \sqrt{b^2 - 4ac})}\right]^{m_1} \quad (54)$$

where $\eta = \phi(1 - S_w)/(1 - \phi)$, $a = -2(1+\eta)$, $b = 2\epsilon_m - \epsilon_n + \eta(2\epsilon_n - \epsilon_m)$,
$c = \epsilon_m\epsilon_n(1+\eta)$ $m_1 = -[(2\epsilon_m + \epsilon_n) + \eta(2\epsilon_n + \epsilon_m)]/[2\sqrt{b^2 - 4ac}]$ In the d.c. limit equation (54) gives $$\sigma = \sigma_w S_w^n \phi^m, \quad n = m = 3/2. \quad (55)$$

The reason behind the equality $n = m = 3/2$ is that it was assumed that both the matrix and hydrocarbon inclusions are spherical. n is the saturation exponent.

The results of the oil-water-matrix with spherical grains is next expanded to include a distribution of spheroidal rock grains and hydrocarbon inclusions i.e., different shapes. Applying the effective medium theory gives $$\frac{1}{3} \sum_\alpha \sum_{i=1}^{3} \left\langle \frac{\epsilon_\alpha - \epsilon}{L_{\alpha i}\epsilon_\alpha + (1 - L_{\alpha i})\epsilon_\alpha} \right\rangle f_\alpha = 0 \quad (56)$$

The angular brackets denote average over the shape distribution of the $\alpha^{th}$ constituent (oil, water or matrix) and $L_{\alpha i}$ is the depolarization factor of the $\alpha^{th}$ constituent in the ith direction. Only platey (spheroidal) grains will be considered. If L is the depolarization factor along the principal axis, $L = L$ and $L = L = (1 - L)/2$. The iterated dilute limit model is then used as above, in this case by computing the change $d\epsilon$ due to an increase in the concentration $dv_n$ of hydrocarbon and $dv_m$ of the matrix, using equation (56). This yields $$\frac{d\epsilon^*}{\epsilon^*} = \frac{1}{3} \frac{dv_m(\epsilon_m - \epsilon^*)}{v_m + v_w + v_n} \left(\frac{(1 + 3L_m)\epsilon_m + (5 - 3L_m)\epsilon^*}{[L_m\epsilon_m + (1 - L_m)\epsilon^*][(1 - L_m)\epsilon_m + (1 + L_m)\epsilon^*]}\right)^m + \quad (57)$$

$$\frac{1}{3} \frac{dv_n(\epsilon_n - \epsilon^*)}{v_m + v_w + v_n} \left(\frac{(1 + 3L_n)\epsilon_n + (5 - 3L_n)\epsilon^*}{[L_n\epsilon_n + (1 - L_n)\epsilon^*][(1 - L_n)\epsilon_n + (1 + L_n)\epsilon^*]}\right)^n$$

where $L_m$ and $L_n$ are the values of L for matrix and hydrocarbon respectively. Again, $v_n$ and $v_m$ can have different functional relations. Assume, as before, that $dv_n = \eta dv_m$. The equation can then be integrated over the volume fractions. In the d.c. limit, equations (57) gives $$\frac{d\sigma}{\sigma} = \frac{dx}{x}\left(\frac{m_m}{1+\eta} + \eta \frac{m_n}{1+\eta}\right) = m\frac{dx}{x}, \quad x = S_w\phi \quad (58)$$

where $$m_m = \left(\frac{5 - 3L_m}{3(1 - L_m^2)}\right)^m$$

$$m_n = \left(\frac{5 - 3L_n}{3(1 - L_n^2)}\right)^n$$

$m = (\eta m_n + m_m)/(1 + \eta)$ are shape factors depending on the distribution of shaped of matrix grains and hydrocarbon inclusions respectively. Integrating equation (58) with respect to x, and requiring that $\sigma = \sigma_w$ when $S_w\phi = 1$ (with $S_w \rightarrow 1$ being taken first) gives:

$$\sigma = \sigma_w(S_w\phi)^m \quad (59)$$

It is noted that m merely reflects the average value of the shape factors of the two non-conducting phases i.e. hydrocarbon and matrix $$m = m_n\frac{(1 - S_w)\phi}{(1 - \phi) + (1 - S_w)\phi} + m_n\frac{1 - \phi}{(1 - \phi) + (1 - S_w)\phi} \quad (60)$$

It is believed that $m_n$ for the hydrocarbon phase may be more like that corresponding to cigar like or needle like objects, (e.g. prolate spheroids) together with spherical ones, if there are tubular pore throats, in addition to the pore nodes. The conductivity can no longer be simply expressed as $\sigma = \sigma_w S_w^n \phi^m$ with m and n as two independent exponents: equation (60) has m depending on $S_w$.

Returning to the complex dielectric constant, by integrating Eq. (57) it is found that $$-\frac{1}{3(1 + \eta)} \ln(S_w\phi) = \int_{\epsilon_w}^{\epsilon} \frac{d\epsilon^*}{\epsilon^*} \frac{D(\epsilon^*)}{N(\epsilon^*)} \quad (61)$$

where, $$N(\epsilon^*)/D(\epsilon^*) = (\epsilon_m - \epsilon^*)\left(\frac{(1 + 3L_m)\epsilon_m + (5 - 3L_m)\epsilon^*}{[L_m\epsilon_m + (1 - L_m)\epsilon^*][(1 - L_m)\epsilon^* + (1 + L_m)\epsilon^*]}\right)^m + \quad (62)$$

-continued $$\eta(\epsilon_n - \epsilon^*) \left( \frac{(1 + 3L_n)\epsilon_n + (5 - 3L_n)\epsilon^*}{[L_n\epsilon_n + (1 - L_n)\epsilon^*][(1 - L_n)\epsilon_n + (1 + L_n)\epsilon^*]} \right)^n$$

For multi-modal distributions one can partially factor the integrand in (61)

$$\frac{D(\epsilon)}{\epsilon N(\epsilon)} = \sum_{i=1}^{N} \frac{P_i}{\epsilon^* - \epsilon_i},$$

where $P_i$ and $\epsilon_i$ are functions of $\epsilon_m$, $\epsilon_n$ and shape functions. Consider the following illustration: The bimodal distribution of matrix grains but spherical hydrocarbon inclusion corresponds to N=4 and equation (61) integrates to $$-\frac{1}{3(1 + \eta)} \ln(S_w \phi) = \frac{4}{\pi} \sum_{i=1}^{} \left( \frac{\epsilon^* - \epsilon_i}{\epsilon_w - \epsilon_i} \right)^{P_i}, \quad (63)$$

If the matrix is made up of spherical grains having $L=\frac{1}{3}$, with probability p and plate like grains having $L=1-\delta$, $\delta<1$, with probability $1-p$, then equation (62) becomes $$N(\epsilon^*)/D(\epsilon^*) = \left[ 9 \frac{(\epsilon_m - \epsilon^*)}{\epsilon_m + 2\epsilon^*} (1 - p) + \frac{(4 - 3\delta)\epsilon_m + (2 + 3\delta)\epsilon^*}{[(1 - \delta)\epsilon_m + \delta\epsilon^*][\delta\epsilon_m + (2 - \delta)\epsilon^*]} p \right] + 9\eta \left( \frac{\epsilon_n - \epsilon^*}{\epsilon_n + 2\epsilon} \right) \quad (64)$$

Next, equation (64) is cast as a sum, $$\sum_{i=1}^{N} \frac{P_i}{\epsilon - \epsilon_i},$$

as stated above. $P_i$ and $\epsilon_i$ can be obtained numerically, and then used in equation (63). Equation (63) can then be solved to obtain $\epsilon^*$.

Figure 18:
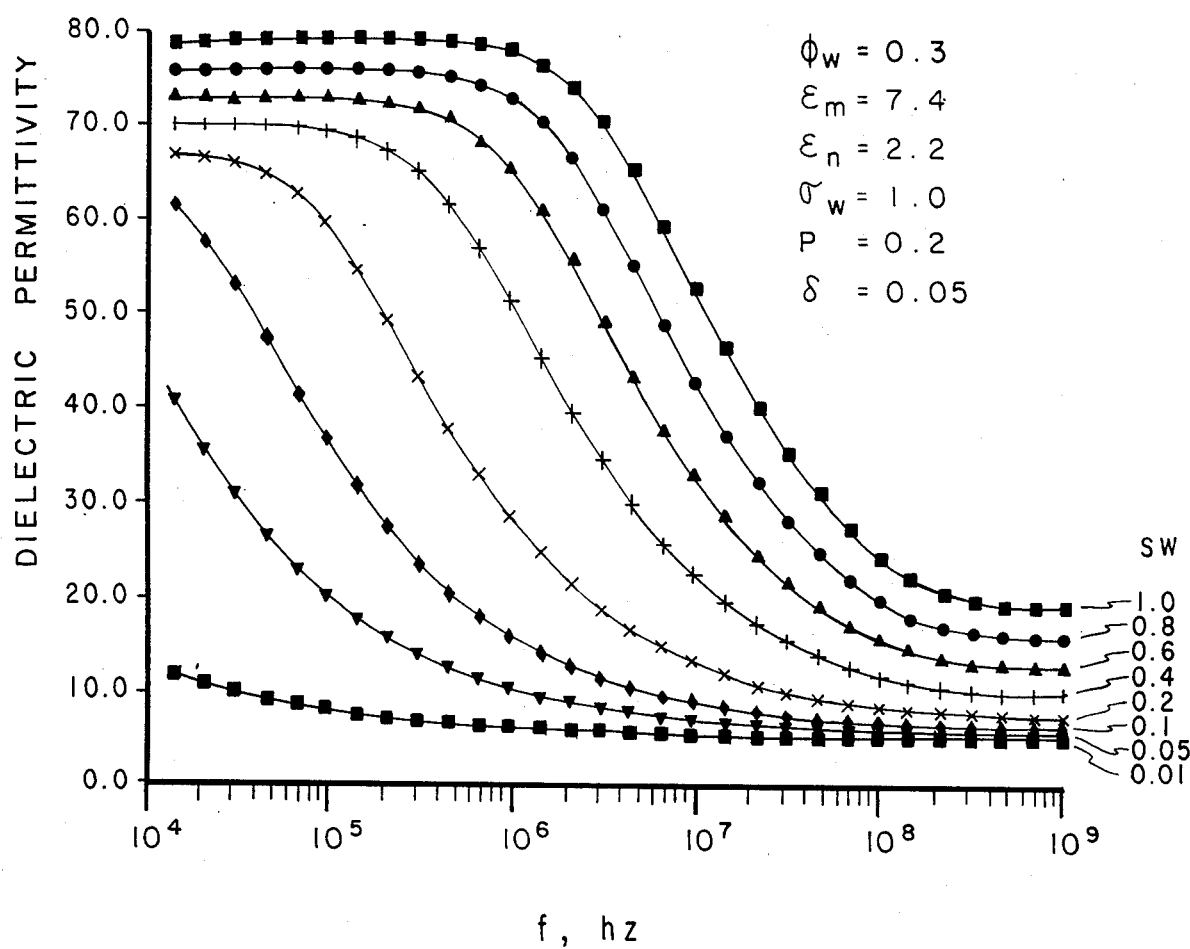
FIGS. 18 and 19 respectively show dielectric permittivity and conductivity versus frequency obtained using a model which includes hydrocarbon.
Figure 19:
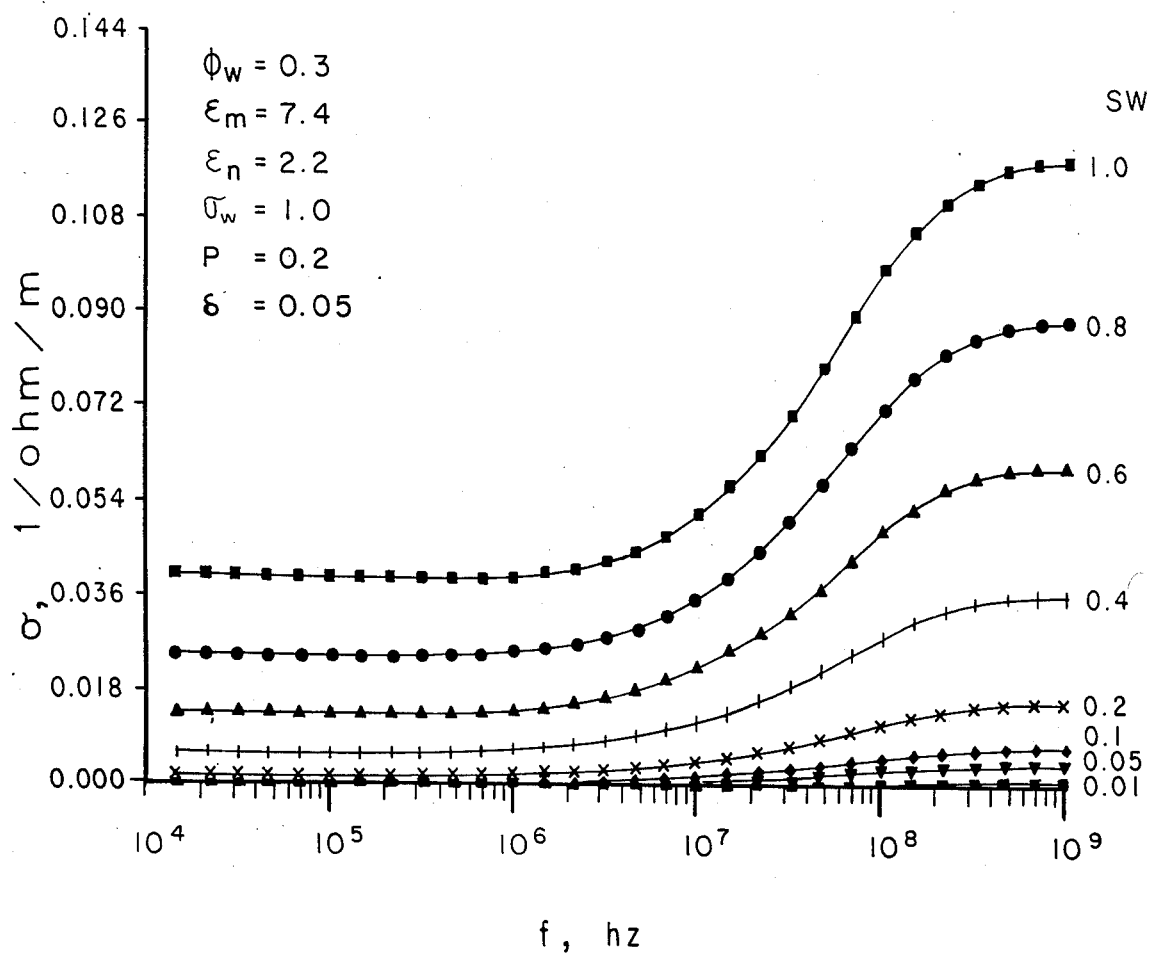

In FIG. 18 $\epsilon'$ is plotted vs. frequency $f = \omega/2\pi$, and in FIG. 19 $\sigma$ is plotted vs. frequency. The material parameters are those appropriate for a limestone $\epsilon_m = 7.4$ saturated with brine of $\sigma_w = 1$ mho/m, and hydrocarbon $\epsilon_n = 2.2$. For clarify of presentation, the dipolar losses in water, which becomes non-negligible near f~1 GHz, have been omitted. Also, $\epsilon_w'$ is practically frequency independent in this range. The textural parameters p=0.2 and $\delta=0.05$ have been used.

As was true for fully water saturated rocks, treated above, a comparison of the (hydrocarbon-containing cases for the unimodal (spherical grains only) model and the bimodal (spherical grains and platey grains) shows that the presence of platey grains can have a large effect on the frequency dispersion of $\epsilon'$ and $\sigma$.

It will be understood from the above that hydrocarbon inclusion can be considered in conjunction with the models hereof.

The invention has been described with reference to particular embodiments, but variations within the spirit and scope of the invention will occur to those skilled in the art. For example, corrections can be implemented to take account of the presence of clays. Further, while specific types of logging tools have been described for the purpose of obtaining measurements of electrical parameters, it will be understood that other types of tools, operating at other frequencies, can be used, consistent with the principles of the invention. Finally, it will be understood that wherever reference is made to conductivity, an appropriate reference to resistivity is implied, and vice versa.

We claim:

1. A method for determining a property of formations surrounding a borehole, comprising the steps of:
    deriving a measured electrical parameter of a formation surrounding the borehole from a logging device moveable through the borehole;
    formulating a textural model of the formation as a function of the electrical parameter, the textural model being a bimodal model in which the formation matrix includes a fraction of spherical grains and a complementary fraction of platey grains; and
    determining a property of the formation from the textural model.

2. The method as defined by claim 1, wherein said platey grains have the same aspect ratio.

3. The method as defined by claim 1, wherein the measured electrical parameter of the formation is the dielectric permittivity of the formation.

4. The method as defined by claim 2, wherein the measured electrical parameter of the formation is the dielectric permittivity of the formation.

5. A method for determining properties of formations surrounding a borehole, comprising the steps of:
    deriving a measured electrical parameter of a formation surrounding the borehole from a logging device moveable through the borehole;
    formulating a textural model of the formation as a function of the electrical parameter;
    determining a property of the formation from the textural model;
    determining another property of the formation from the textural model;
    comparing the determined another property against a predetermined value for said another property;
    modifying the textural model based on said comparison; and
    determining a modified value of said first-mentioned property of the formation from the modified textural model.

6. The method as defined by claim 1, further comprising the steps of:
    determining another property of the formation from the textural model;
    comparing the determined another property against a predetermined value for said another property;
    modifying the textural model based on said comparison; and
    determining a modified value of said first-mentioned property of the formation from the modified textural model.

7. The method as defined by claim 4, further comprising the steps of:
    determining another property of the formation from the textural model;
    comparing the determined another property against a predetermined value for said another property;

modifying the textural model based on said comparison; and determining a modified value of said first-mentioned property of the formation from the modified textural model.

8. The method as defined by claim 1, wherein said step of formulating a textural model comprises formulating high frequency and low frequency versions of said textural model, and wherein said property is determined from said high and low frequency versions of said textural model.

9. The method as defined by claim 2, wherein said step of formulating a textural model comprises formulating high frequency and low frequency versions of said textural model, and wherein said property is determined from said high and low frequency versions of said textural model.

10. A method for determining the water-filled porosity of formations surrounding a borehole, comprising the steps of:

deriving a measured electrical parameter of a formation surrounding the borehole from a logging device moveable through the borehole;

formulating a textural model of the formation as a function of the measured parameter, the textural model being a bimodal model in which the formation matrix includes a fraction of spherical grains and a complementary fraction of platey grains; and determining the water-filled porosity of the formation from the textural model.

11. The method as defined by claim 10, wherein said platey grains have the same aspect ratio.

12. The method as defined by claim 10, wherein said electrical parameter is derived from phase and attenuation measurements of electromagnetic energy in the formation.

13. The method as defined by claim 10, wherein said electrical parameter is dielectric permittivity.

14. The method as defined by claim 11, wherein said electrical parameter is dielectric permittivity.

15. The method as defined by claim 10, wherein said deriving step including deriving dielectric permittivity and conductivity of the formation; and wherein said textural model is formulated as a function of the derived parameters.

16. The method as defined by claim 11, wherein said deriving step includes deriving dielectric permittivity and conductivity of the formation; and wherein said textural model is formulated as a function of the derived parameters.

17. The method as defined by claim 13, further comprising the step of determining conductivity of the formation from the textural model.

18. The method as defined by claim 14, further comprising the step of determining conductivity of the formation from the textural model.

19. The method as defined by claim 17, further comprising comparing the determined conductivity against a predetermined conductivity, modifying the textural model in accordance with the comparison, and determining a modified water-filled porosity from the modified textural model.

20. The method as defined by claim 18, further comprising comparing the determined conductivity against a predetermined conductivity, modifying the textural model in accordance with the comparison, and determining a modified water-filled porosity from the modified textural model.

21. The method as defined by claim 20, wherein said step of modifying the textural model comprises modifying the fraction of platey grains in said model.

22. The method as defined by claim 20, wherein said step of modifying the textural model comprises modifying the aspect ratio of the platey grains in said model.

23. The method as defined by claim 10, wherein said step of formulating a textural model comprises formulating high and low frequency versions of said textural model.

24. The method as defined by claim 11, wherein said step of formulating a textural model comprises formulating high and low frequency versions of said textural model.

25. The method as defined by claim 23, further comprising the steps of determining a low frequency conductivity of the formation from the textural model, comparing the determined low frequency conductivity against a predetermined low frequency conductivity, modifying the textural model in accordance with the comparison, and determining a modified water-filled porosity from the modified textural model.

26. The method as defined by claim 24, further comprising the steps of determining a low frequency conductivity of the formation from the textural model, comparing the determined low frequency conductivity against a predetermined low frequency conductivity, modifying the textural model in accordance with the comparison, and determining a modified water-filled porosity from the modified textural model.

27. A method for determining textural properties of formations surrounding a borehole, comprising the steps of:

deriving a measured electrical parameter of a formation surrounding the borehole from a logging device moveable through the borehole;

formulating a textural model of the formation as a function of the derived parameter, the textural model being a bimodal model in which the formation matrix includes a fraction of spherical grains and a complementary fraction of platey grains; and determining the textural properties of the formation from the textural model.

28. The method as defined by claim 27, wherein said platey grains have the same aspect ratio.

29. The method as defined by claim 28, wherein the determined textural properties are the fractions of spherical and platey grains and the aspect ratio of the platey grains.

30. The method as defined by claim 27, wherein said step of deriving a measured electrical parameter includes deriving a dielectric permittivity parameter, a high frequency conductivity parameter, and a low frequency conductivity parameter, and wherein said step of formulating a textural model comprises formulating high and low frequency versions of said model.

31. The method as defined by claim 28, wherein said step of deriving a measured electrical parameter includes deriving a dielectric permittivity parameter, a high frequency conductivity parameter, and a low frequency conductivity parameter, and wherein said step of formulating a textural model comprises formulating high and low frequency versions of said model.

32. The method as defined by claim 30, further comprising the step of determining the water-filled porosity of the formation from the textural model.

33. The method as defined by claim 31, further comprising the step of determining the water-filled porosity of the formation from the textural model.

34. The method as defined by claim 27, further comprising the step of determining the cementation of the formation from the textural properties.

35. The method as defined by claim 31, further comprising the step of determining the cementation of the formation from the textural properties.

36. The method as defined by claim 33, further comprising the step of determining the cementation of the formation from the textural properties.

37. The method as defined by claim 29, further comprising the step of determining the cementation of the formation from the fractions of spherical and platey grains and the aspect ratio of the platey grains.

38. A method for producing a depth-varying recording of the water-filled porosity of formations surrounding a borehole logged by a logging device, comprising the steps of:
  (a) deriving, from a logging measurement at a particular depth level, an electrical parameter of a formation at said particular depth level;
  (b) formulating a textural model of the formation as a function of the derived parameter, the textural model being a bimodal model in which the formation matrix includes a fraction of spherical grains and a complementary fraction of platey grains;
  (c) determining the water-filled porosity at said depth level from the textural model;
  (d) recording the determined water-filled porosity for the particular depth level; and
  (e) repeating steps (a) through (d) for other depth levels so as to obtain a depth-varying recording of water-filled porosity.

39. The method as defined by claim 38, wherein said platey grains have the same aspect ratio.

40. The method as defined by claim 38, wherein said electrical parameter is derived from phase and attenuation measurements of electromagnetic energy in the formation.

41. The method as defined by claim 39, wherein said electrical parameter is derived from phase and attenuation measurements of electromagnetic energy in the formation.

42. The method as defined by claim 40, wherein said electrical parameter is dielectric permittivity.

43. The method as defined by claim 41, wherein said electrical parameter is dielectric permittivity.

44. The method as defined by claim 40, wherein said deriving step includes deriving dielectric permittivity and conductivity of the formation; and wherein said textural model is formulated as a function of the derived parameters.

45. The method as defined by claim 41, wherein said deriving step includes deriving dielectric permittivity and conductivity of the formation; and wherein said textural model is formulated as a function of the derived parameters.

46. The method as defined by claim 42, further comprising the step of determining, at each depth level, the conductivity of the formation from the textural model.

47. The method as defined by claim 43, further comprising the step of determining, at each depth level, the conductivity of the formation from the textural model.

48. The method as defined by claim 46, further comprising comparing the determined conductivity against a predetermined conductivity, modifying the textural model in accordance with the comparison, and determining a modified water-filled porosity from the modified textural model.

49. The method as defined by claim 47, further comprising comparing the determined conductivity against a predetermined conductivity, modifying the textural model in accordance with the comparison, and determining a modified water-filled porosity from the modified textural model.

50. The method as defined by claim 38, wherein said step of formulating a textural model comprises formulating high and low frequency versions of said textural model.

51. The method as defined by claim 39, wherein said step of formulating a textural model comprises formulating high and low frequency versions of said textural model.

52. The method as defined by claim 50, further comprising the steps of determining a low frequency conductivity of the formation from the textural model, comparing the determined low frequency conductivity against a predetermined low frequency conductivity, modifying the textural model in accordance with the comparison, and determining a modified water-filled porosity from the modified textural model.

53. The method as defined by claim 51, further comprising the steps of determining a low frequency conductivity of the formation from the textural model, comparing the determined low frequency conductivity against a predetermined low frequency conductivity, modifying the textural model in accordance with the comparison, and determining a modified water-filled porosity from the modified textural model.

54. A method for producing a depth-varying recording of textural properties of formations surrounding a borehole logged by a logging device, comprising the steps of:
  (a) deriving, from a logging measurement at a particular depth level, an electrical parameter of the formation at said particular depth level;
  (b) formulating a textural model of the formation as a function of the derived parameter, the textural model being a bimodal model in which the formation matrix includes a fraction of spherical grains and a complementary fraction of platey grains;
  (c) determining the textural properties at said depth level from the textural model;
  (d) recording the determined textural properties for the particular depth level; and
  (e) repeating steps (a) through (d) for other depth levels so as to obtain a depth-varying recording of textural properties.

55. The method as defined by claim 54, wherein said platey grains have the same aspect ratio.

56. The method as defined by claim 55, wherein the determined textural properties are the fractions of spherical and platey grains and the aspect ratio of the platey grains.

57. The method as defined by claim 54, wherein said electrical parameter is derived from phase and attenuation measurements of electromagnetic energy in the formation.

58. The method as defined by claim 56, wherein said electrical parameter is derived from phase and attenuation measurements of electromagnetic energy in the formation.

59. The method as defined by claim 57, wherein said deriving step includes deriving dielectric permittivity and conductivity of the formation; and wherein said textural model is formulated as a function of the derived parameters.

60. The method as defined by claim 58, wherein said deriving step includes deriving dielectric permittivity and conductivity of the formation; and wherein said textural model is formulated as a function of the derived parameters.

61. The method as defined by claim 54, wherein said step of deriving a electrical parameter includes deriving a dielectric permittivity parameter, a high frequency conductivity parameter, and a low frequency conductivity parameter, and wherein said step of formulating a textural model comprises formulating high and low frequency versions of said model.

62. A method for producing a depth-varying recording of cementation of formations surrounding a borehole logged by a logging device, comprising the steps of:
(a) deriving, from a logging measurement at a particular depth level, an electrical parameter of the formation at said particular depth level;
(b) formulating a textural model of the formation as a function of the derived parameter, the textural model being a bimodal model in which the formation matrix includes a fraction of spherical grains and a complementary fraction of platey grains;
(c) determining the textural properties at said depth level from the textural model;
(d) determining the cementation from the textural model;
(e) recording the determined cementation for the particular depth level; and
(f) repeating steps (a) through (e) for other depth levels so as to obtain a depth-varying recording of cementation.

63. The method as defined by claim 62, wherein said platey grains have the same aspect ratio.

64. The method as defined by claim 63, wherein the determined textural properties are the fractions of spherical and platey grains and the aspect ratio of the platey grains.

65. The method as defined by claim 64, wherein said electrical parameter is derived from phase and attenuation measurements of electromagnetic energy in the formation.

66. The method as defined by claim 65, wherein said deriving step includes deriving dielectric permittivity and conductivity of the formation; and wherein said textural model is formulated as a function of the derived parameters.

67. The method as defined by claim 64, wherein said step of deriving an electrical parameter includes deriving a dielectric permittivity parameter, a high frequency conductivity parameter and a low frequency conductivity parameter, and wherein said step of formulating a textural model comprises formulating high and low frequency versions of said model.

68. Apparatus for determining a property of formations surrounding a borehole, comprising:
means for deriving a measured electrical parameter of a formation surrounding the borehole from a logging device moveable through the borehole;
means for formulating a textural model of the formations as a function of the electrical parameter, the textural model being a bimodal model in which the formation matrix includes a fraction of spherical grains and a complementary fraction of platey grains; and
means for determining a property of the formation from the textural model.

69. Apparatus as defined by claim 68, wherein the measured electrical property of the formation is the dielectric permittivity of the formation.

70. Apparatus for determining the water-filled porosity of formations surrounding a borehole, comprising:
means for deriving a measured electrical parameter of a formation surrounding the borehole from a logging device moveable through the borehole;
means for formulating a textural model of the formation as a function of the measured parameter, the textural model being a bimodal model in which the formation matrix includes a fraction of spherical grains and a complementary fraction of platey grains; and
means for determining the water-filled porosity of the formation from the textural model.

71. Apparatus as defined by claim 70, wherein said platey grains have the same aspect ratio.

72. Apparatus as defined by claim 71, wherein said electrical parameter is dielectric permittivity and is derived from phase and attenuation measurements of electromagnetic energy in the formation.

73. Apparatus for determining textural properties of formations surrounding a borehole, comprising:
means for deriving a measured electrical parameter of a formation surrounding the borehole from a logging device moveable through the borehole;
means for formulating a textural model of the formation as a function of the derived parameter, the textural model being a bimodal model in which the formation matrix includes a fraction of spherical grains and a complementary fraction of platey grains; and
means for determining the textural properties of the formation from the textural model.

74. Apparatus as defined by claim 73, wherein said platey grains have the same aspect ratio.

75. Apparatus as defined by claim 74, wherein the determined textural properties are the fractions of spherical and platey grains and the aspect ratio of the platey grains.

76. Apparatus as defined by claim 75, further comprising means for determining the water-filled porosity of the formation from the textural model.

77. Apparatus as defined by claim 75, further comprising means for determining the cementation of the formation from the textural properties.

78. The method as defined by claim 1, wherein said textural model of the formation includes chunks of material with a porosity between the chunks, the material of said chunks also having a porosity and including a matrix which has spherical grains and a complementary fraction of platey grains.

79. The method as defined by claim 10, wherein said textural model of the formation includes chunks of material with a porosity between the chunks, the material of said chunks also having a porosity and including a matrix which has spherical grains and a complementary fraction of platey grains.

80. The method as defined by claim 27, wherein said textural model of the formation includes chunks of material with a porosity between the chunks, the material of said chunks also having a porosity and including a matrix which has spherical grains and a complementary fraction of platey grains.

81. The method as defined by claim 38, wherein said textural model of the formation includes chunks of material with a porosity between the chunks, the material of said chunks also having a porosity and including a matrix which has spherical grains and a complementary fraction of platey grains.

82. The method as defined by claim 68, wherein said textural model of the formation includes chunks of material with a porosity between the chunks, the material of said chunks also having a porosity and including a matrix which has spherical grains and a complementary fraction of platey grains.

83. The method as defined by claim 1, wherein said textural model of the formation includes coated spheres of material with a porosity between the coated spheres, said coated spheres having a core of solid matrix material coated with coating material that has a porosity and includes a matrix having spherical grains and a complementary fraction of platey grains.

84. The method as defined by claim 10, wherein said textural model of the formation includes coated spheres of material with a porosity between the coated spheres, said coated spheres having a core of solid matrix material coated with coating material that has a porosity and includes a matrix having spherical grains and a complementary fraction of platey grains.

85. The method as defined by claim 27, wherein said textural model of the formation includes coated spheres of material with a porosity between the coated spheres, said coated spheres having a core of solid matrix material coated with coating material that has a porosity and includes a matrix having spherical grains and a complementary fraction of platey grains.

86. The method as defined by claim 38, wherein said textural model of the formation includes coated spheres of material with a porosity between the coated spheres, said coated spheres having a core of solid matrix material coated with coating material that has a porosity and includes a matrix having spherical grains and a complementary fraction of platey grains.

87. The method as defined by claim 68, wherein said textural model of the formation includes coated spheres of material with a porosity between the coated spheres, said coated spheres having a core of solid matrix material coated with coating material that has a porosity and includes a matrix having spherical grains and a complementary fraction of platey grains.

88. The method as defined by claim 1, wherein said model has a fluid which includes water and hydrocarbon.

89. The method as defined by claim 10, wherein said model has a fluid which includes water and hydrocarbon.

90. The method as defined by claim 27, wherein said model has a fluid which includes water and hydrocarbon.

91. The method as defined by claim 38, wherein said model has a fluid which includes water and hydrocarbon.

92. The method as defined by claim 68, wherein said model has a fluid which includes water and hydrocarbon.

* * * * *